United States Patent
Johnson et al.

(10) Patent No.: US 11,708,777 B2
(45) Date of Patent: Jul. 25, 2023

(54) LIQUID ONLY LANCE INJECTOR

(71) Applicant: CUMMINS EMISSION SOLUTIONS INC., Columbus, IN (US)

(72) Inventors: Samuel Johnson, East Wenatchee, WA (US); John G. Buechler, Indianapolis, IN (US); Matthew K. Volmerding, Columbus, IN (US); Jacob W. Brown, Columbus, IN (US); Gaurav Hemant Pandit, Columbus, IN (US)

(73) Assignee: Cummins Emission Solutions Inc., Columbus, IN (US)

(*) Notice: Subject to any disclaimer, the term of this patent is extended or adjusted under 35 U.S.C. 154(b) by 0 days.

(21) Appl. No.: 17/350,218

(22) Filed: Jun. 17, 2021

(65) Prior Publication Data

US 2021/0317764 A1 Oct. 14, 2021

Related U.S. Application Data

(62) Division of application No. 16/909,010, filed on Jun. 23, 2020, now Pat. No. 11,268,417.

(Continued)

(51) Int. Cl.
*F01N 3/20* (2006.01)
*F01N 13/14* (2010.01)

(52) U.S. Cl.
CPC .......... *F01N 3/206* (2013.01); *F01N 13/146* (2013.01); *F01N 2610/146* (2013.01);

(Continued)

(58) Field of Classification Search
CPC .............. F01N 13/146; F01N 2610/02; F01N 2610/11; F01N 2610/14; F01N 2610/1406;

(Continued)

(56) References Cited

U.S. PATENT DOCUMENTS

| 5,743,879 A | 4/1998 | Kriesel | |
| 6,279,603 B1 * | 8/2001 | Czarnik | B01D 53/8625 137/340 |

(Continued)

FOREIGN PATENT DOCUMENTS

| CN | 104696052 A | 6/2015 |
| CN | 208010436 U | 10/2018 |

(Continued)

OTHER PUBLICATIONS

Combined Search and Examination Report issued for UK Patent Application No. GB 2009672.3, dated Nov. 23, 2020, 5 pages.

(Continued)

*Primary Examiner* — Carl C Staubach
*Assistant Examiner* — Diem T Tran
(74) *Attorney, Agent, or Firm* — Foley & Lardner LLP

(57) ABSTRACT

A lance injector assembly for an exhaust component includes: an exhaust conduit; a shaft configured to extend into the exhaust conduit and dispense reductant from a hydraulically-actuated valve; an actuator configured to operate the hydraulically-actuated valve; and a mounting system configured to couple the actuator and the shaft to the exhaust conduit. The mounting system prevents the actuator from directly contacting the exhaust conduit.

15 Claims, 18 Drawing Sheets

Related U.S. Application Data

(60) Provisional application No. 62/867,086, filed on Jun. 26, 2019.

(52) U.S. Cl.
CPC .............. *F01N 2610/1406* (2013.01); *F01N 2610/1433* (2013.01); *F01N 2610/1473* (2013.01); *F01N 2900/1808* (2013.01); *F01N 2900/1821* (2013.01)

(58) Field of Classification Search
CPC ..... F01N 2610/1433; F01N 2610/1453; F01N 2610/146; F01N 2610/1473; F01N 2900/1808; F01N 2900/1811; F01N 2900/1821; F01N 3/206; F01N 3/2066; Y02T 10/12
See application file for complete search history.

(56) References Cited

U.S. PATENT DOCUMENTS

| | | |
|---|---|---|
| 6,382,600 B1 | 5/2002 | Mahr |
| 6,505,500 B1 | 1/2003 | Elgh et al. |
| 7,000,381 B2 | 2/2006 | Maisch |
| 7,021,047 B2 | 4/2006 | Hilden et al. |
| 7,066,401 B2 | 6/2006 | Huffman et al. |
| 7,481,986 B2 | 1/2009 | Gabrielsson et al. |
| 7,874,148 B2 | 1/2011 | Duffield |
| 7,976,712 B2 | 7/2011 | Rocheux et al. |
| 8,151,770 B2 | 4/2012 | Kawashima et al. |
| 8,171,721 B2 | 5/2012 | Boddy et al. |
| 8,281,570 B2 | 10/2012 | Gierszewski et al. |
| 8,388,323 B2 | 3/2013 | Cooke |
| 8,910,884 B2 | 12/2014 | Thomas et al. |
| 8,978,361 B2 | 3/2015 | Bruck et al. |
| 8,978,364 B2 | 3/2015 | Olivier et al. |
| 9,528,414 B2 | 12/2016 | Mitchell et al. |
| 9,617,889 B2 | 4/2017 | Trivedi et al. |
| 9,957,868 B2 | 5/2018 | Johnson |
| 10,024,213 B2 | 7/2018 | Mitchell et al. |
| 2006/0108443 A1 | 5/2006 | Huffman et al. |
| 2007/0092413 A1 | 4/2007 | Hirata et al. |
| 2007/0257069 A1 | 11/2007 | Gibson et al. |
| 2008/0011780 A1 | 1/2008 | Cooke |
| 2008/0014103 A1 | 1/2008 | Cooke |
| 2008/0022663 A1 | 1/2008 | Dodge et al. |
| 2008/0145297 A1 | 6/2008 | Johannes et al. |
| 2010/0186389 A1 | 7/2010 | Sun et al. |
| 2013/0081377 A1 | 4/2013 | Burger |
| 2013/0186073 A1 | 7/2013 | Onodera et al. |
| 2013/0299604 A1 | 11/2013 | Thomas et al. |
| 2014/0154142 A1 | 6/2014 | Johnson et al. |
| 2014/0363357 A1* | 12/2014 | Trivedi ................. F01N 3/2066 165/104.11 |
| 2015/0260071 A1 | 9/2015 | Reichert et al. |
| 2015/0352491 A1 | 12/2015 | Valentine et al. |

FOREIGN PATENT DOCUMENTS

| | | |
|---|---|---|
| DE | 10 2006 020 439 A1 | 11/2007 |
| DE | 10 2008 001 010 A1 | 10/2008 |
| EP | 2 060 758 A2 | 5/2009 |
| EP | 2 140 117 B1 | 5/2012 |
| GB | 2 578 219 | 4/2020 |
| JP | 2005-344597 A | 12/2005 |
| WO | WO-2005/033480 A1 | 4/2005 |
| WO | WO-2011/148810 A1 | 12/2011 |

OTHER PUBLICATIONS

Combined Search and Examination Report issued for UK Patent Application No. GB 2112970.5 dated Feb. 10, 2022, 3 pages.
Non-Final Office Action issued for U.S. Appl. No. 17/471,743 dated Feb. 8, 2022, 20 pages.
Combined Search and Examination Report issued for UK Paten Application No. GB 2107111.3 dated Jun. 16, 2021, 2 pages.
Combined Search and Examination Report issued for UK Patent Application No. GB 2107112.1, dated Jun. 3, 2021, 3 pages.
Final Office Action in U.S. Appl. No. 17/471,743 dated May 18, 2022.
Non-Final Office Action in U.S. Appl. No. 17/350,262 dated May 18, 2022.
Non-Final Office Action in U.S. Appl. No. 17/350,262, dated Nov. 28, 2022.

* cited by examiner

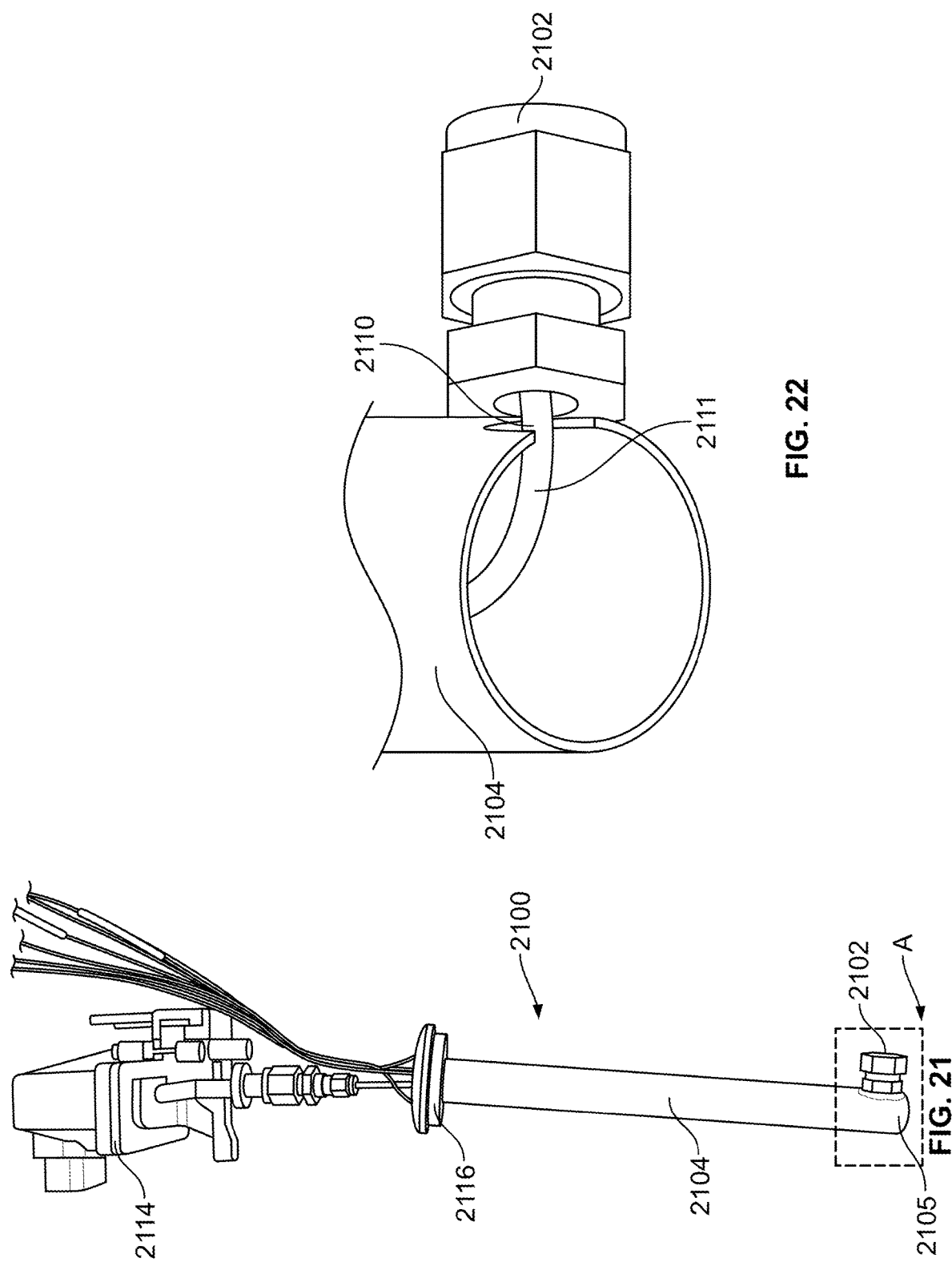

LIQUID ONLY LANCE INJECTOR

CROSS-REFERENCE TO RELATED APPLICATIONS

The present application is a divisional of U.S. patent application Ser. No. 16/909,010, filed Jun. 23, 2020, which claims the benefit of U.S. Provisional Application No. 62/867,086, filed Jun. 26, 2019. These disclosures are hereby incorporated by reference in their entireties.

TECHNICAL FIELD

The present application relates generally to systems and methods for reductant delivery in aftertreatment systems for internal combustion engines.

BACKGROUND

For internal combustion engines, such as diesel engines, nitrogen oxide ($NO_x$) compounds may be emitted in the engine exhaust. It may be desirable to reduce $NO_x$ emissions to, for example, comply with environmental regulations. To reduce $NO_x$ emissions, a reductant may be dosed into the exhaust by a dosing system. The reductant facilitates conversion of a portion of the exhaust into non-$NO_x$ emissions, such as nitrogen ($N_2$), carbon dioxide ($CO_2$), and water ($H_2O$), thereby reducing $NO_x$ emissions.

SUMMARY

In one embodiment, a lance injector assembly for an exhaust component includes a reductant source and a lance. The lance injector assembly includes a lance and a poppet valve. The lance includes a lance housing, a supply passage fluidly coupled to a reductant source and terminating at a nozzle orifice, and a return passage fluidly coupled to the reductant source. The poppet valve is positioned downstream of the nozzle orifice and includes a poppet movable between a closed position and an open position. When operating in a recirculation mode, the poppet is in the closed position to permit a full portion of reductant supplied to the lance from the reductant source to return to the reductant source. When operating in an injection mode, the poppet is in the open position to permit a first portion of reductant to flow from the nozzle orifice and a second portion of reductant to return to the reductant source.

In some embodiments, the lance includes an insulating layer surrounding the supply passage and the return passage. In other embodiments, the insulating layer includes a vacuum insulation material.

In some embodiments, the lance housing includes a first housing portion and a second housing portion. The first housing portion is oriented perpendicularly to the second housing portion.

In some embodiments, the supply passage is coaxially aligned with the return passage. In other embodiments, the return passage at least partially surrounds the supply passage.

In some embodiments, the lance injector assembly includes a supply pump configured to increase a pressure of reductant in the supply passage when the lance injector assembly is operating in the injection mode. In other embodiments, the supply pump includes a voice coil or solenoid. In further embodiments, the lance injector assembly includes a controller programmed to control the supply pump such that the pressure of reductant in the supply passage when the lance injector assembly is operating in the injection mode is within a range of 25 to 35 bar. In still further embodiments, the lance injector assembly includes a controller programmed to control the supply pump such that the pressure of reductant in the supply passage when the lance injector assembly is operating in the recirculation mode is within a range of 9 to 11 bar.

In some embodiments, the lance injector does not use air as a transport mechanism for a supply of reductant.

In another embodiment, a lance injector assembly for an exhaust component is provided. The lance injector assembly includes an exhaust conduit and a shaft configured to extend into the exhaust conduit and dispense reductant from a hydraulically-actuated valve. The lance injector assembly further includes an actuator configured to operate the hydraulically-actuated valve, and a mounting system configured to couple the actuator and the shaft to the exhaust conduit. The mounting system prevents the actuator from directly contacting the exhaust conduit.

In some embodiments, the lance injector assembly includes multiple cooling lines located within the shaft. The cooling lines are configured to circulate a coolant. In other embodiments, the coolant is at least one of reductant, an engine fluid, a transmission fluid, air (or any other onboard gas), and/or refrigerant as a cooling medium.

In some embodiments, a length of the shaft is within a range of 2.5 inches to 6.5 inches.

In some embodiments, the hydraulically-actuated valve comprises a spring operated valve. In other embodiments, the spring operated valve comprises a spring configured to exert a preload force against a valve member. The valve member is configured to block reductant from flowing through a nozzle orifice.

In some embodiments, the lance injector does not use air as a transport mechanism for a supply of reductant.

In some embodiments, the hydraulically-actuated valve is configured to be operated by controlling a pressure of the reductant.

In some embodiments, the hydraulically-actuated valve is configured to be operated by mechanical actuation of a shaft component.

In some embodiments, a lance injector assembly for an exhaust component comprises: a shaft configured to extend into an exhaust conduit of the exhaust component, the shaft being hollow so as to define a channel therethrough, wherein an opening is defined in a wall of the shaft proximate to a second end of the shaft that is opposite the first end; a cap coupled to a first end of the shaft; and a supply line disposed within the channel defined by the shaft, wherein a nozzle is disposed at a downstream end of the supply line, the nozzle being fluidly coupled to the shaft around the opening such that reductant is able to flow from the nozzle through the opening and into an exhaust gas flowing through the exhaust conduit, wherein air is present in the space between the supply line and the wall of the shaft, the air inhibiting heat transfer to the supply line.

In some embodiments, the lance injector assembly further comprises: an adapter coupled to the downstream end of the supply line, the adapter defining an aperture therethrough, the nozzle being disposed on or defined by a downstream end of the aperture, wherein the aperture has a first diameter proximate to the supply line and a second diameter smaller than the first diameter distal from the supply line such that the aperture tapers inwardly from the supply line towards the nozzle.

In some embodiment, the cap comprises: an annular portion; a central hub disposed circumferentially inwards of the annular portion around a longitudinal axis of the cap; and a plurality of radial ribs extending from an outer periphery of the central hub to an inner periphery of the annular portion and coupled to the annular portion such that gaps are defined between adjacent ribs of the plurality of ribs, wherein the supply line extends through the central hub into the shaft. In some embodiments, the cap further comprises: an insulating bushing disposed in the central hub around a portion of the supply line that us disposed in the central hub, the insulating bush configured to inhibit heat transfer to the supply line from the central hub.

In some embodiments, the lance injector assembly further comprises: an insulating layer disposed around the shaft. In some embodiments, the lance injector assembly further comprises: an adapter protruding outwardly from the opening, the nozzle being included in the adapter.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 21 is a side view of a liquid only lance injector assembly, according to an embodiment.

FIG. 22 is a bottom, side view of a portion of the liquid only lance injector assembly of FIG. 21 indicated by the arrow A in FIG. 21 with a lower portion of a shaft of the lance injector assembly removed.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for delivering reductant through conduits within an aftertreatment system of an internal combustion engine system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gases that are often treated by a doser within an aftertreatment system. Dosers typically treat exhaust gases using a reductant. The reductant is typically provided from the doser into a dosing lance which distributes (e.g., doses, injects) the reductant into an exhaust stream within an exhaust component.

Centerline-style lance injectors that extend to the approximate centerline of an exhaust pipe provide several advantages over tangential or side mount dosers, which may incur problems with impingement or deposit formation inside the mixer and low inherent uniformity in the reductant spray. Many centerline-style dosing systems utilize an air pump to propel the reductant from the dosing lance into the exhaust stream. The air pump may draw air from an air source (e.g., air intake) and provide air to a dosing lance that is configured to mix the air and reductant into an air-reductant mixture. However, the inclusion of an air pump for this purpose may add unnecessary cost and complexity to the aftertreatment system. In some vehicles, the addition of an air supply system may be impossible.

Implementations described herein relate to an exhaust aftertreatment system that includes a liquid only (i.e., airless) lance injector. Existing liquid only lance injector systems utilize tangential or side mount dosers to protect the doser actuation valve from the high heat conditions experienced within the exhaust stream, which may include temperatures up to 650° C. The centerline-style doser embodiments described herein locate any sensitive actuator components outside of the flow the exhaust gas and use a variety of hydraulic actuation methods within the lance assembly itself to control the flow of reductant from the doser. In addition, the embodiments described herein utilize a various insulating and cooling methods to protect the lance and the reductant supply from deposit formation.

II. Overview of Aftertreatment System

Figure 1:
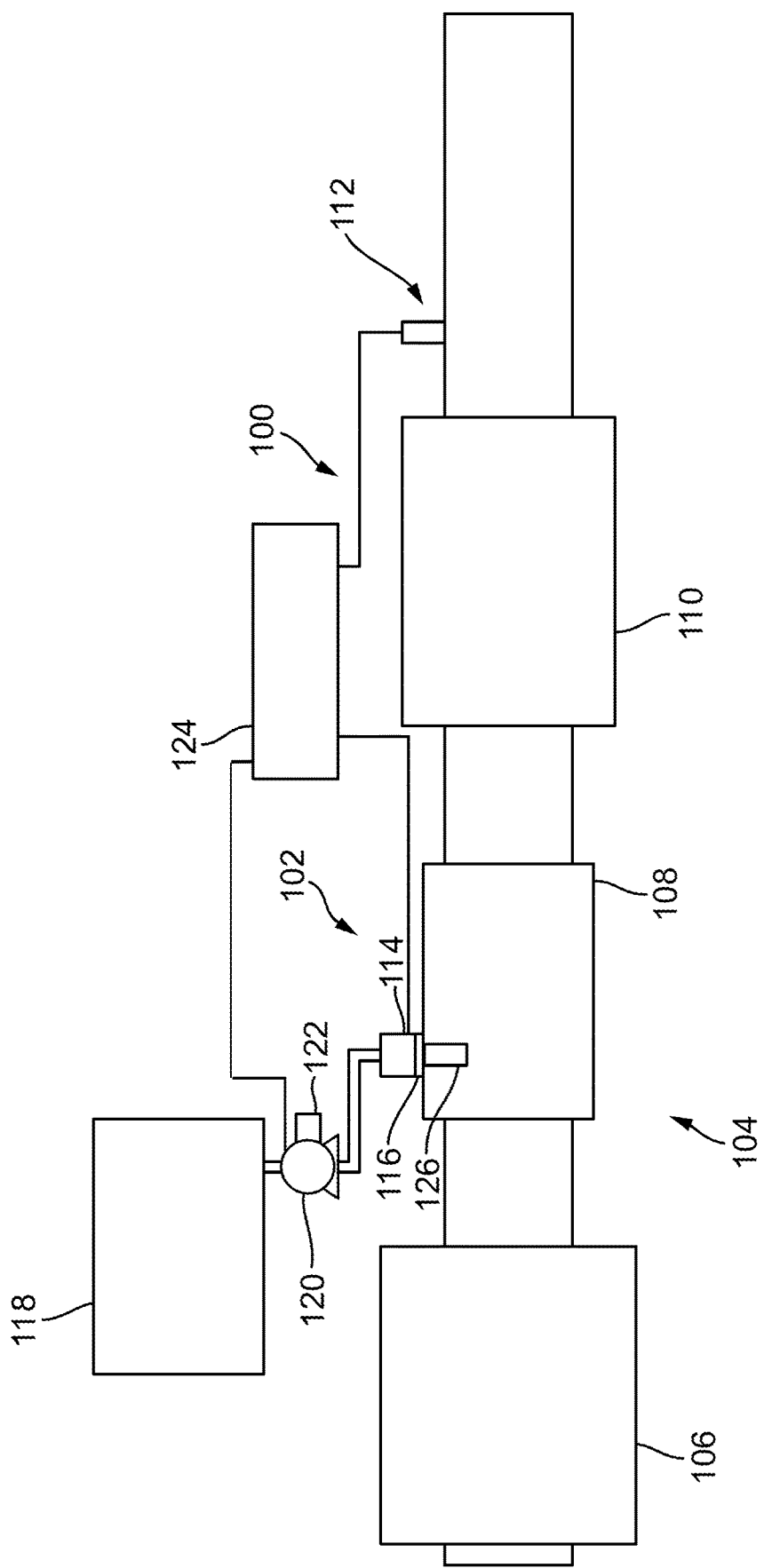
FIG. 1 is a block schematic diagram of an example aftertreatment system.

FIG. 1 depicts an aftertreatment system 100 having an example reductant delivery system 102 for an exhaust system 104. The aftertreatment system 100 also includes a particulate filter (e.g., a diesel particulate filter (DPF) 106, a decomposition chamber 108 (e.g., reactor, reactor pipe, etc.), a SCR catalyst 110, and a sensor 112.

The DPF 106 is configured to (e.g., structured to, able to, etc.) remove particulate matter, such as soot, from exhaust gas flowing in the exhaust system 104. The DPF 106 includes an inlet, where the exhaust gas is received, and an outlet, where the exhaust gas exits after having particulate matter substantially filtered from the exhaust gas and/or converting the particulate matter into carbon dioxide. In some implementations, the DPF 106 may be omitted.

The decomposition chamber 108 is configured to convert a reductant into ammonia. The reductant may be, for example, urea, diesel exhaust fluid (DEF), Adblue®, an urea water solution (UWS), an aqueous urea solution (e.g., AUS32, etc.), and other similar fluids. The decomposition chamber 108 includes a reductant delivery system 102 having a doser or dosing module 114 configured to dose the reductant into the decomposition chamber 108 (e.g., via an injector). In some implementations, the reductant is injected upstream of the SCR catalyst 110. The reductant droplets then undergo the processes of evaporation, thermolysis, and hydrolysis to form gaseous ammonia within the exhaust system 104. The decomposition chamber 108 includes an inlet in fluid communication with the DPF 106 to receive the exhaust gas containing $NO_x$ emissions and an outlet for the exhaust gas, $NO_x$ emissions, ammonia, and/or reductant to flow to the SCR catalyst 110.

The decomposition chamber 108 includes the dosing module 114 mounted to the decomposition chamber 108 such that the dosing module 114 may dose the reductant into the exhaust gases flowing in the exhaust system 104. The dosing module 114 may include an insulator 116 interposed between a portion of the dosing module 114 and the portion of the decomposition chamber 108 on which the dosing module 114 is mounted. The dosing module 114 is fluidly coupled to (e.g., fluidly configured to communicate with, etc.) a reductant source 118. The reductant source 118 may include multiple reductant sources 118. The reductant source 118 may be, for example, a diesel exhaust fluid tank containing Adblue®.

A supply unit or reductant pump 120 is used to pressurize the reductant from the reductant source 118 for delivery to the dosing module 114. In some embodiments, the reductant pump 120 is pressure controlled (e.g., controlled to obtain a target pressure, etc.). The reductant pump 120 includes a filter 122. The filter 122 filters (e.g., strains, etc.) the reductant prior to the reductant being provided to internal components (e.g., pistons, vanes, etc.) of the reductant pump 120. For example, the filter 122 may inhibit or prevent the transmission of solids (e.g., solidified reductant, contaminants, etc.) to the internal components of the reductant pump 120. In this way, the filter 122 may facilitate prolonged desirable operation of the reductant pump 120. In some embodiments, the reductant pump 120 is coupled to a chassis of a vehicle (e.g., maritime vehicle, boat, shipping boat, barge, container ship, terrestrial vehicle, construction vehicle, truck, etc.) associated with the aftertreatment system 100.

The dosing module 114 and reductant pump 120 are also electrically or communicatively coupled to a controller 124. The controller 124 is configured to control the dosing module 114 to dose the reductant into the decomposition chamber 108. The controller 124 may also be configured to control the reductant pump 120. The controller 124 may include a microprocessor, an application-specific integrated circuit (ASIC), a field-programmable gate array (FPGA), etc., or combinations thereof. The controller 124 may include memory, which may include, but is not limited to, electronic, optical, magnetic, or any other storage or transmission device capable of providing a processor, ASIC, FPGA, etc. with program instructions. This memory may include a memory chip, Electrically Erasable Programmable Read-Only Memory (EEPROM), Erasable Programmable Read Only Memory (EPROM), flash memory, or any other suitable memory from which the associated controller 124 can read instructions. The instructions may include code from any suitable programming language.

The SCR catalyst 110 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 110 includes an inlet in fluid communication with the decomposition chamber 108 from which exhaust gas and reductant are received and an outlet in fluid communication with an end of the exhaust system 104.

The exhaust system 104 may further include an oxidation catalyst (e.g., a diesel oxidation catalyst (DOC)) in fluid communication with the exhaust system 104 (e.g., downstream of the SCR catalyst 110 or upstream of the DPF 106) to oxidize hydrocarbons and carbon monoxide in the exhaust gas.

In some implementations, the DPF 106 may be positioned downstream of the decomposition chamber 108. For instance, the DPF 106 and the SCR catalyst 110 may be combined into a single unit. In some implementations, the dosing module 114 may instead be positioned downstream of a turbocharger or upstream of a turbocharger.

The sensor 112 may be coupled to the exhaust system 104 to detect a condition of the exhaust gas flowing through the exhaust system 104. In some implementations, the sensor 112 may have a portion disposed within the exhaust system 104; for example, a tip of the sensor 112 may extend into a portion of the exhaust system 104. In other implementations, the sensor 112 may receive exhaust gas through another conduit, such as one or more sample pipes extending from the exhaust system 104. While the sensor 112 is depicted as positioned downstream of the SCR catalyst 110, it should be understood that the sensor 112 may be positioned at any other position of the exhaust system 104, including upstream of the DPF 106, within the DPF 106, between the DPF 106 and the decomposition chamber 108, within the decomposition chamber 108, between the decomposition chamber 108 and the SCR catalyst 110, within the SCR catalyst 110, or downstream of the SCR catalyst 110. In addition, two or more sensors 112 may be utilized for detecting a condition of the exhaust gas, such as two, three, four, five, or six sensors 112 with each sensor 112 located at one of the aforementioned positions of the exhaust system 104.

The dosing module 114 includes a dosing lance assembly 126. The dosing lance assembly 126 includes a delivery conduit (e.g., delivery pipe, delivery hose, etc.). The delivery conduit is fluidly coupled to the reductant pump 120. The dosing lance assembly 126 includes at least one injector 128. The injector 128 is configured to dose the reductant into the exhaust gases (e.g., within the decomposition chamber 108, etc.). While not shown, it is understood that the dosing module 114 may include a plurality of injectors 128.

III. Liquid Only Lance Assembly

Figure 2:
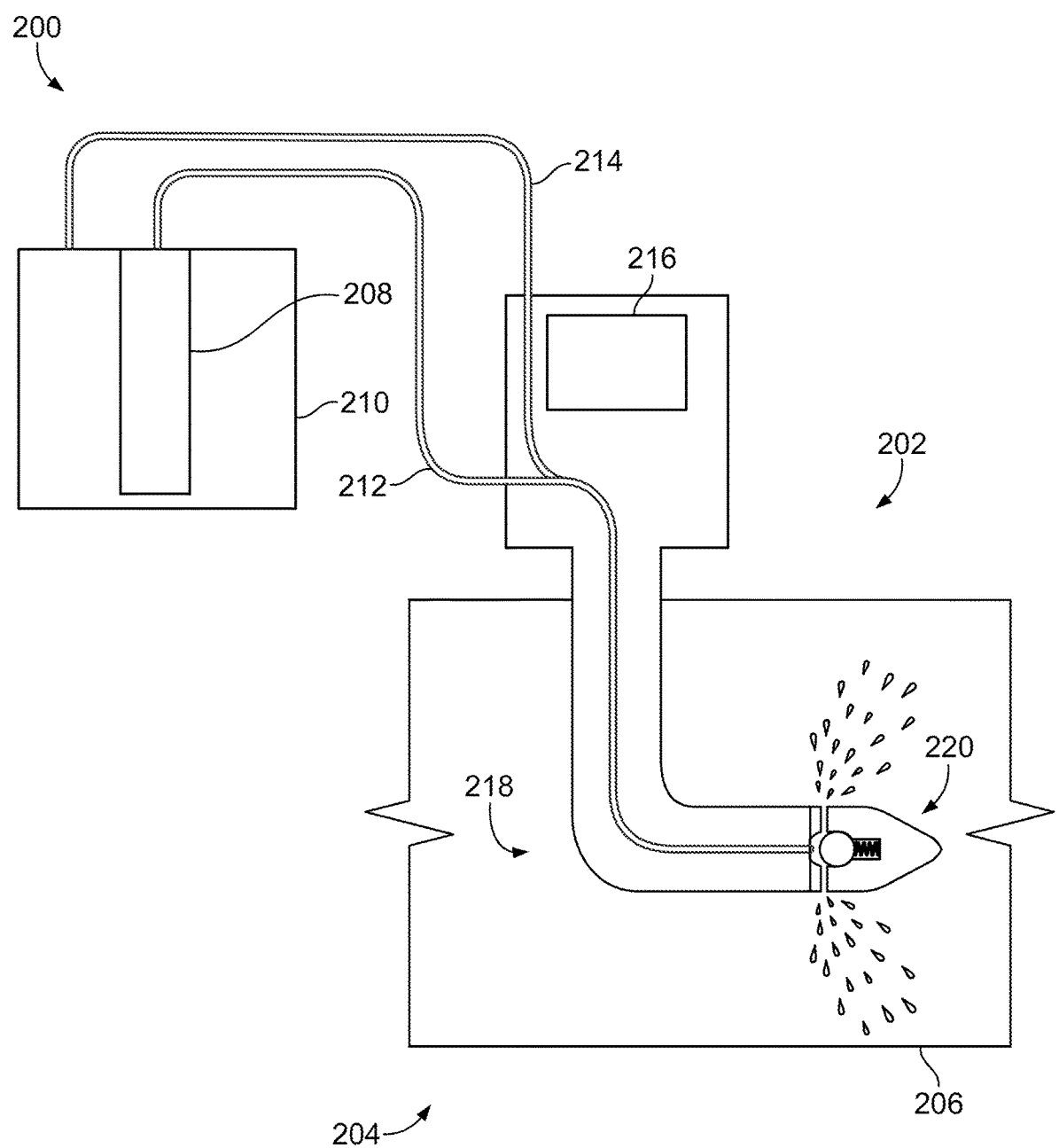
FIG. 2 is a block schematic diagram of a liquid only lance injector assembly for use in an aftertreatment system, such as the example aftertreatment system shown in FIG. 1.

FIG. 2 illustrates an example liquid only aftertreatment system 200. The liquid only aftertreatment system 200 is included in an internal combustion engine system. The system receives and treats exhaust gages produced by the internal combustion engine.

The aftertreatment system 200 includes a dosing assembly 202, analogous to the dosing module 114 in FIG. 1, and an exhaust system 204, analogous to the exhaust system 104 in FIG. 1. The dosing assembly 202 is configured to selectively dose reductant into an exhaust conduit 206, such as the decomposition chamber 108 in FIG. 1, of the aftertreatment system. In various embodiments, the dosing assembly 202 is mounted on (e.g., coupled to, attached to) the exhaust conduit 206. For example, the dosing assembly 202 may extend through an aperture in the exhaust conduit 206 and be fastened to the exhaust conduit 206 about the aperture. The exhaust conduit 206 is configured to receive exhaust gases from the internal combustion engine (e.g., from an exhaust manifold, from a DPF, from an upstream component of the aftertreatment system) and provide treated exhaust gases to a downstream component of the aftertreatment system (e.g., an SCR catalyst).

The dosing assembly 202 is supplied with reductant from a reductant pump 208, analogous to the reductant pump 120. The reductant pump 208 may be located within a reductant tank 210, as depicted in FIG. 2, or remotely mounted from the reductant tank 210. The reductant tank 210 is configured to store reductant therein. In various embodiments, the reductant pump 208 may be a bladder pump, a peristaltic pump, or any other suitable type of pump. The reductant pump 208 may include an internal filter configured to filter or strain the reductant to remove contaminants. In some embodiments, the pump 208 operates on the reductant before the reductant passes through the filter. In other embodiments, the pump 208 operates on the reductant after the reductant passes through the filter. In various embodiments, the internal filter may comprise a cellulose material, a polymer material, a mesh, or any other media suitable for performing filtering activities.

The reductant pump 208 may further include a heater configured to heat the reductant in the filter. For example, the heater may be configured to maintain the temperature of the reductant in the filter above the freezing temperature of the reductant. In some embodiments, the reductant pump 208 includes reverse flow capabilities that may aid in purging or extracting reductant from the aftertreatment system 200 in the event of a shutdown of the aftertreatment system 200 or whenever else system purging is required.

The reductant pump 208 is fluidly coupled to the dosing assembly 202 using a supply line 212. The supply line 212 may comprise a hose, a tube, a channel, or the like. The dosing assembly 202 is shown to include a supply pump 216, and a lance injector assembly 218. The lance injector assembly 218 may be configured to operate in a recirculation mode and an injection mode, described in further detail below. In the recirculation mode, no reductant is discharged from the lance injector assembly 218 and all reductant supplied through the supply line 212 is returned to the reductant tank 210 via a return line 214. The return line 214 may comprise a hose, a tube, a channel, or the like. In the injection mode, a first portion of reductant discharged from lance injector assembly 218 and a second portion of reductant is returned to the reductant tank 210 via the return line 214.

The supply pump 216 may act to increase the pressure within the supply line 212. For example, when the supply pump 216 is not activated, the pressure of the reductant within the supply line 212 may range from approximately (i.e., ±10%) 5 bar (i.e., 73 psi) to 11 bar (i.e., 160 psi). When the supply pump 216 is activated, the pressure of the reductant within the supply line 212 may be increased to a high value ranging from 11.1 bar (i.e., 161 psi) to 100 bar (i.e., 1,450 psi). The pressure increase in the supply line 212 may be sufficient to actuate a hydraulic actuator in the lance injector assembly 218 and permit a flow of reductant to exit the lance injector assembly 218. In this way, the injection rate of the flow or reductant from the lance injector assembly 218 may be calibrated to the operation of the supply pump 216.

The supply pump 216 is electrically or communicatively coupled to a controller (not shown), analogous to the controller 124 in FIG. 1. The controller is programmed to control the supply pump 216. The controller may include a microprocessor, an application-specific integrated circuit (ASIC), a field-programmable gate array (FPGA), etc., or combinations thereof. The controller may include memory, which may include, but is not limited to, electronic, optical, magnetic, or any other storage or transmission device capable of providing a processor, ASIC, FPGA, etc. with program instructions. This memory may include a memory chip, Electrically Erasable Programmable Read-Only Memory (EEPROM), Erasable Programmable Read Only Memory (EPROM), flash memory, or any other suitable memory from which the associated controller can read instructions. The instructions may include code from any suitable programming language.

In some embodiments, the supply pump 216 includes a solenoid or a voice coil actuator. The solenoid or voice coil actuator may be configured such that the nominal position of the solenoid or voice coil is open to permit the flow of reductant for recirculation purposes and to permit purging of reductant from the dosing assembly 202 in the absence of a signal or power provided to the solenoid or voice coil. In some embodiments, the supply pump 216 additionally includes pressure and temperature sensors configured to detect the pressure and temperature of the reductant within the supply line 212. For example, when the temperature sensors detect freezing conditions in the supply line 212, the supply pump 216 may act to evacuate the dosing assembly 202 to avoid damage caused by reductant expansion. Similarly, the supply pump 216 may act to evacuate the dosing assembly 202 when temperature sensors detect a hot shutdown, because overheating the reductant can result in the formation of solid deposits that may clog the dosing assembly 202.

The lance injector assembly 218 is shown to extend into the exhaust conduit 206 such that the outlet of the lance injector assembly 218 is positioned at the approximate centerline of the exhaust conduit 206. Centerline injectors provide several advantages over other types of injectors including the prevention of reductant deposits and impingement. Delivery conduit or lance injector assembly 218 is shown to include a lance housing having a substantially L-shaped geometry. In other words, a first portion of the housing of the lance injector assembly 218 may be oriented substantially perpendicularly to a second portion of the housing of the lance injector assembly 218. This orientation may permit gravity to aid in draining reductant from the lance injector assembly 218 upon shutdown of the aftertreatment system 200. In other embodiments, different geometries for the housing of the lance injector assembly 218 may be utilized.

Figure 3:
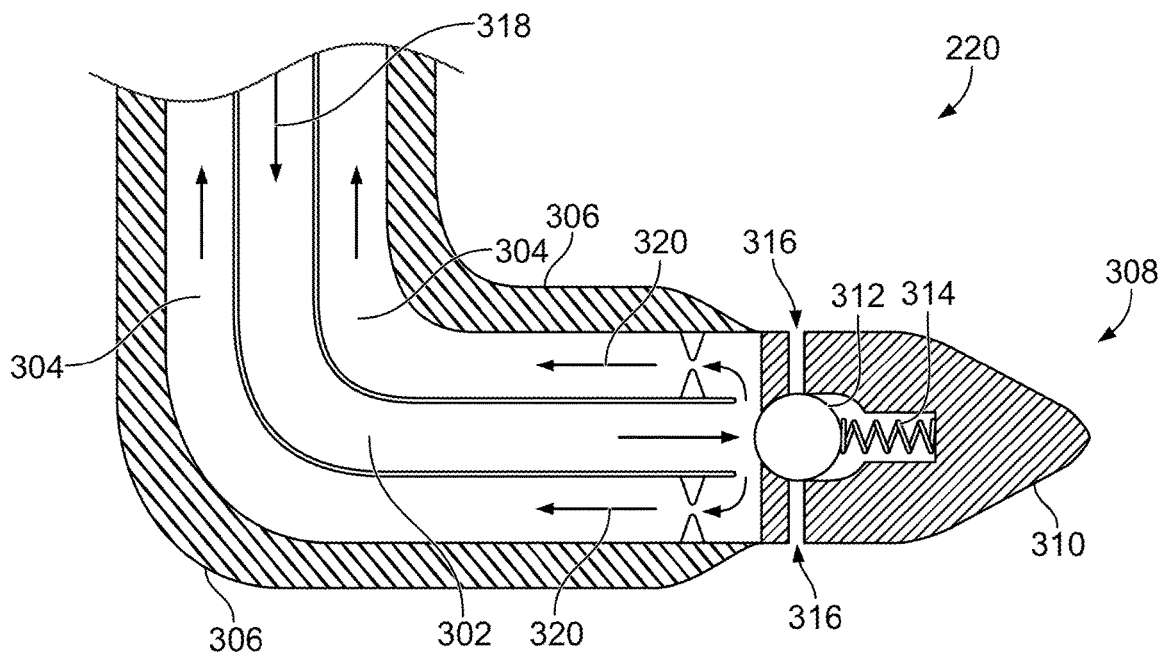
FIG. 3 is a cross-sectional view of a liquid only lance in a closed position for use in an injector assembly, such as the example injector assembly shown in FIG. 2.
Figure 4:
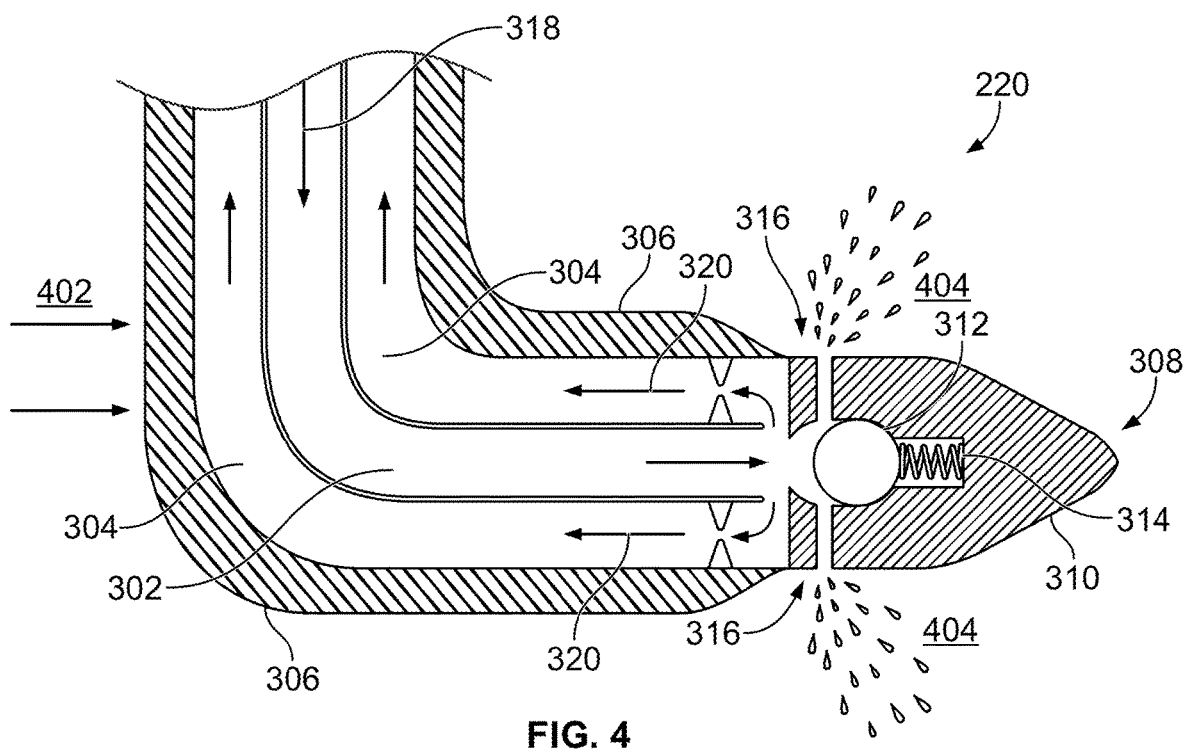
FIG. 4 is a cross-sectional view of a liquid only lance in an open position for use in an injector assembly, such as the example injector assembly shown in FIG. 2.

FIGS. 3 and 4 depict the lance injector assembly 218 in the reductant recirculation and injection modes, respectively. Reductant may be supplied to the lance injector assembly 218 using a supply passage 302 that is fluidly coupled to the supply line 212. The supply passage 302 may be surrounded by one or more return passages 304 that are fluidly coupled to the return line 214. The flow of reductant through the return passages 304 may cool the supply passage 302 and prevent deposits from forming in the supply passage 302. In some embodiments, the supply passage 302 may be situated in a coaxial orientation with a single return passage 304 that fully surrounds and permits the flow of reductant around the entire supply passage 302. In other embodiments, one or more discrete return passages 304 may be situated around the supply passage 302. The supply passage 302 and the return passage 304 may be surrounded by an insulating layer 306 that slows or prevents the transfer of heat from the exhaust flow to the supply passage 302. In some embodiments, the insulating layer 306 is a vacuum insulator, meaning that the layer includes at least one space either substantially or completely evacuated of air. In other embodiments, the insulating layer 306 may be fabricated from any other suitable insulating material.

A poppet valve assembly 308 may be positioned downstream of a supply flow 318 of reductant traveling through the supply passage 302. By positioning the poppet valve assembly 308 downstream of the supply flow 318, crystallization of the reductant and a risk of clogging the supply passage 302 is minimized. The poppet valve assembly 308 includes an outer shell 310 and a poppet 312 that is coupled to a spring 314. Each of the components of the poppet valve assembly 308 may be fabricated from one or more high temperature materials, such as 300 or 400 series stainless steel, austenitic nickel-chromium-based superalloys (Inconel), or nickel-based alloys. The shape of the outer shell 310 may be aerodynamically optimized (i.e., formed with a geometry similar to the nose cone of an airplane) to prevent exhaust recirculation around the lance injector assembly 218, which could result in the formation of reductant deposits.

When the lance injector assembly 218 is operating in the recirculation mode, as depicted in FIG. 3, the poppet 312 is in a closed position. In the closed position, the poppet 312 is seated against one or more nozzle openings 316 to prevent the supply flow 318 of reductant from exiting the lance injector assembly 218. Instead, the entire supply flow 318 of reductant is returned to the return line 214 as a return flow 320 passing through the one or more return passages 304. A preload force holding the poppet 312 in the seated position may be provided by spring 314. In other embodiments, the preload force is provided by another component or method.

When the lance injector assembly 218 is operating in the injection mode, as depicted in FIG. 4, the poppet 312 is in an open position. For example, the lance injector assembly 218 may operate in the injection mode when an exhaust flow 402 is passing through the exhaust system in which the lance injector assembly 218 is mounted. The poppet 312 may transition from the closed position of the recirculation mode to the open position of the injection mode upon the activation of the supply pump 216, which increases the pressure of the supply flow 318. The increased pressure of the supply flow 318 provided by the supply pump 216 is sufficient to overcome the preload force of the spring 314 and force the poppet 312 to retract into the outer shell 310, thereby moving the poppet 312 off of its seat on the nozzle opening 316 and permitting an injection flow 404 to pass through the nozzle opening 316. In some embodiments, the poppet 312 travels only between a fully closed position and a fully open position. In other words, the poppet 312 is not configured to stop at any intermediate positions between the fully closed and fully open positions. This permits the lance injector assembly 218 to precisely control the injection of reductant according to variables such as time and pressure rather than valve position.

At the same time as the injection flow 404 is expelled from the nozzle openings 316, a portion of the reductant supplied to the lance injector assembly 218 as supply flow 318 travels through the return passage 304 as return flow 320 to cool the supply passage 302. For example, if the supply pump 216 is operating between approximately 7.5 bar (i.e., 109 psi) and 10 bar (i.e., 145 psi), the return flow 320 may range between approximately 4 and 9 liters per hour. As the supply flow 318 transitions from the supply passage 302 to the return passage 304 and becomes the return flow 320, it may pass through a donut shaped orifice proximate the one or more nozzle openings 316. The donut-shaped orifice may generate a pressure drop, resulting in high pressure atomization across the nozzle openings 316.

Figure 5:
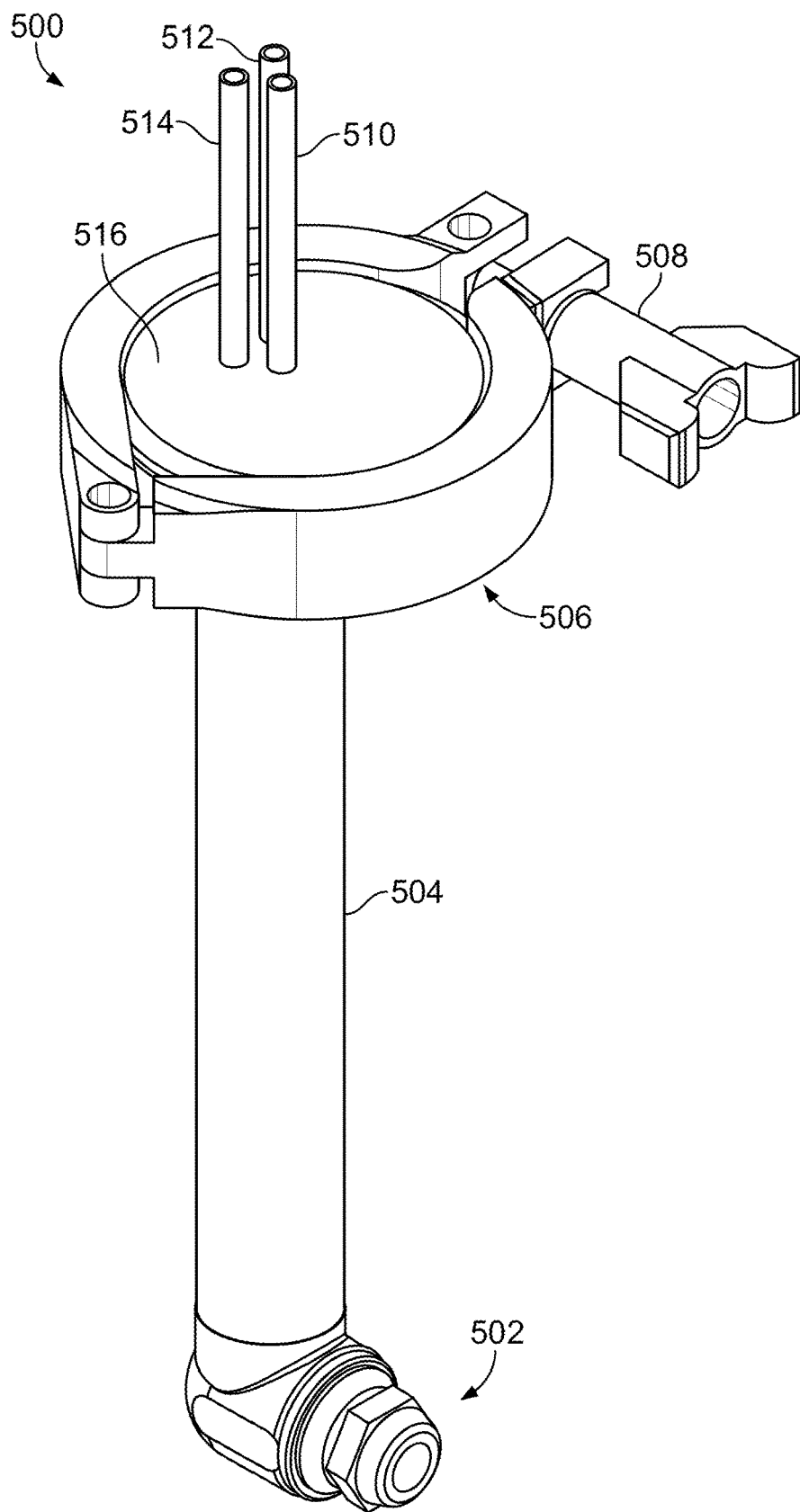
FIG. 5 is a perspective view of another example liquid only lance injector assembly for use in an aftertreatment system, such as the example aftertreatment system shown in FIG. 1.
Figure 6:
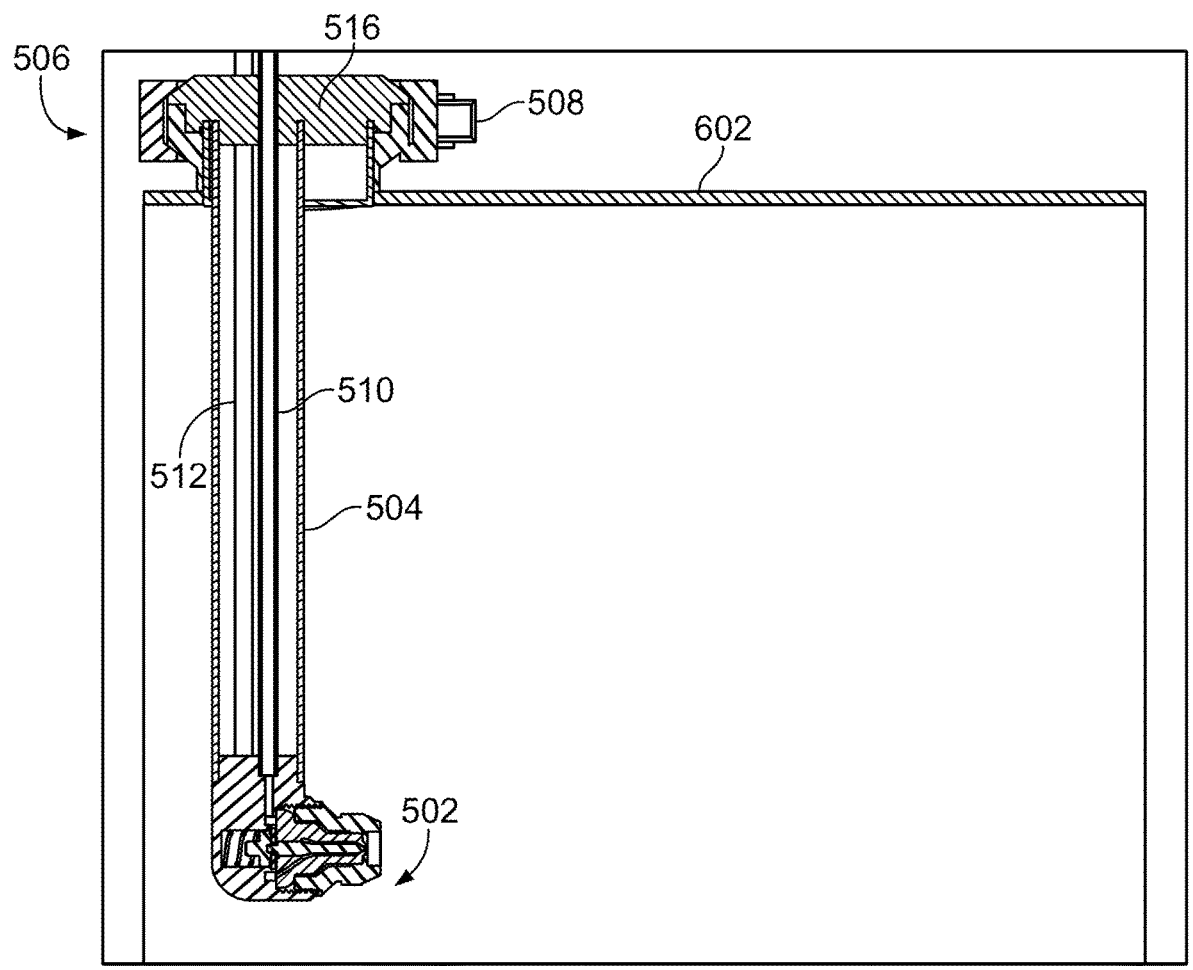
FIG. 6 is a cross-sectional view of the example liquid only lance injector assembly shown in FIG. 5.
Figure 7:
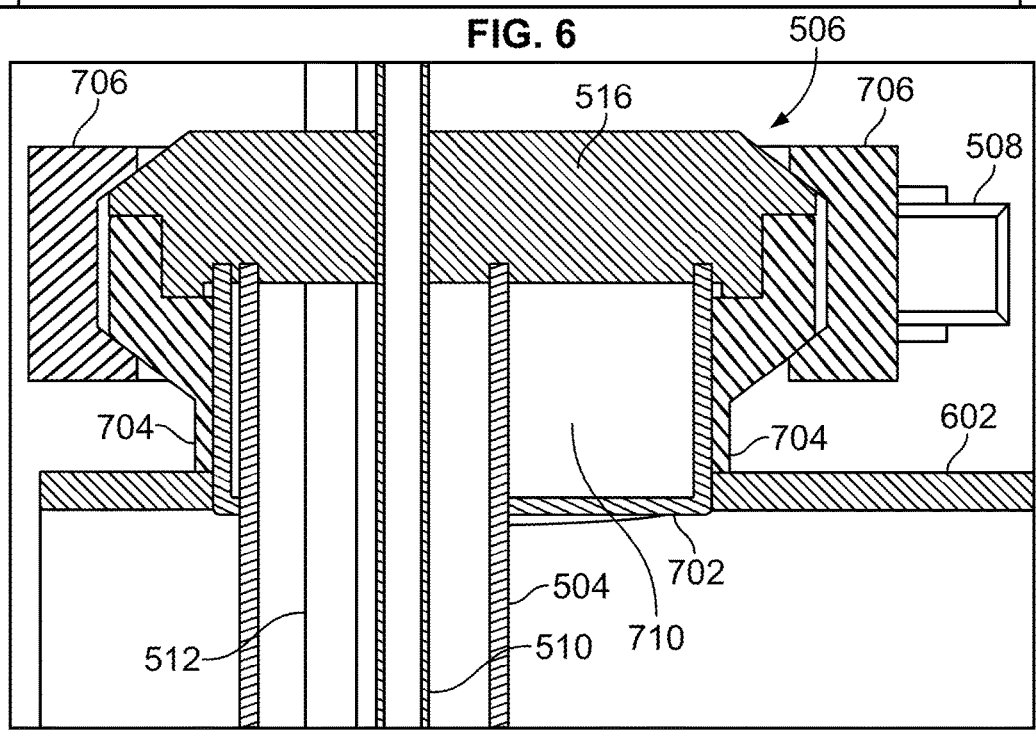
FIG. 7 is another cross-sectional view of the example liquid only lance injector assembly shown in FIG. 5.

Referring now to FIGS. 5-7, another example of a liquid only lance injector assembly 500 is depicted. Specifically, FIG. 5 depicts a perspective view of the lance injector assembly 500, while FIGS. 6 and 7 depict cross-sectional views of the lance injector assembly 500. The lance injector assembly 500 includes a hydraulically-actuated nozzle assembly 502 situated at the end of a shaft 504. The shaft 504 may be mounted to an exhaust conduit or pipe using a mounting system 506. The mounting system 506 may be coupled to a remote actuator 508 that is configured to activate the nozzle assembly or otherwise control a supply of pressurized fluid to the hydraulically-actuated nozzle assembly 502. In various embodiments, the remote actuator 508 may be any suitable type of electronic actuator.

A supply line 510 and cooling lines 512, 514 may be situated within the shaft 504 to supply reductant to the hydraulically-actuated nozzle assembly 502 and to cool the supply line 510 to prevent the formation of deposits. In some embodiments, the cooling lines 512, 514 are supplied with reductant. In other embodiments, the cooling lines 512, 514 are supplied with a different coolant fluid (e.g., engine fluid, transmission fluid, air or any other onboard gas, refrigerant as a cooling medium, etc.). The supply line 510 and cooling lines 512, 514 may be located and retained within the shaft 504 through use of an outer cap component 516. In some embodiments, a thermal barrier coating 518 may be applied to the side of the shaft 504 facing the exhaust flow in order to provide additional thermal protection to the assembly 500.

As depicted specifically in FIGS. 6 and 7, the mounting system 506 of the lance injector assembly 500 may be configured to prevent the remote actuator 508 from directly contacting an exhaust pipe 602 on which the lance injector assembly 500 is mounted. Instead, the mounting system 506 may include a spacer component 702, an inner cap component 704, and mounting ring members 706. In various embodiments, one or more of the components 702-706 is fabricated from stainless steel. An insulating region 710 may be formed between the spacer component 702 and the outer cap component 516 to prevent the transfer of heat from the exhaust pipe 602 to the remote actuator 508. In various embodiments, the insulating region 710 may be filled with air, a vacuum, or an insulating material.

Figure 8:
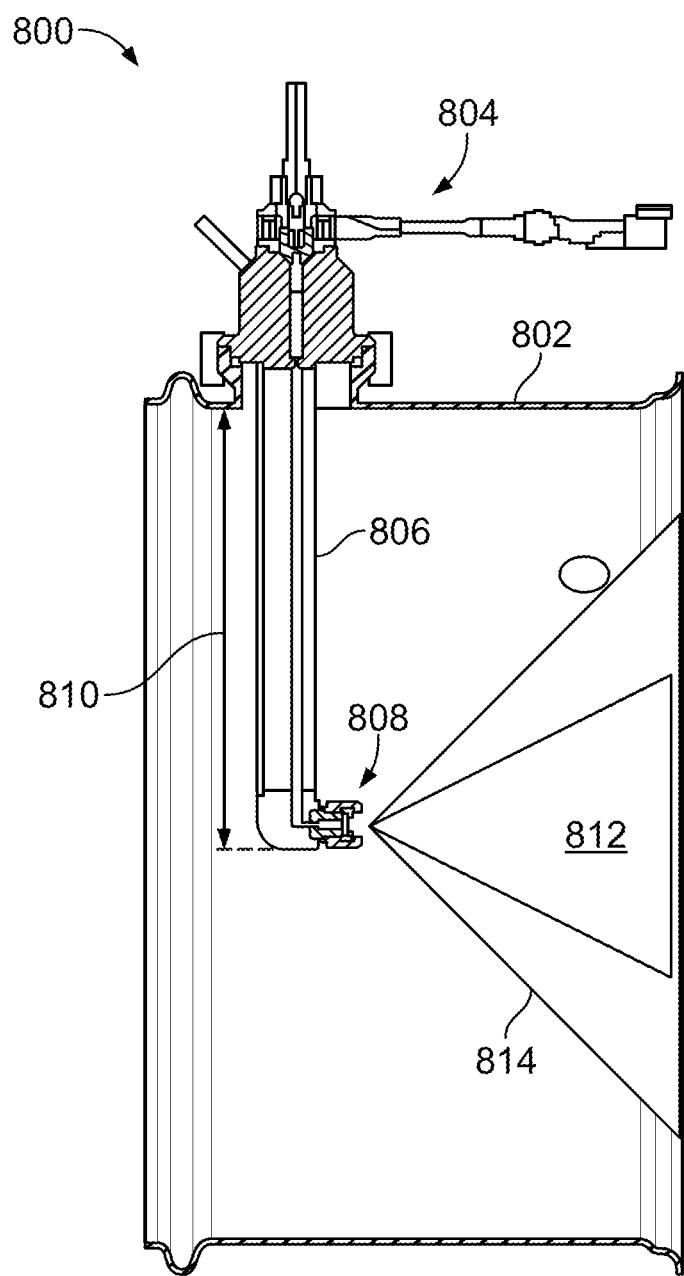
FIG. 8 is another cross-sectional view of the example liquid only lance injector assembly shown in FIG. 5.
Figure 9:
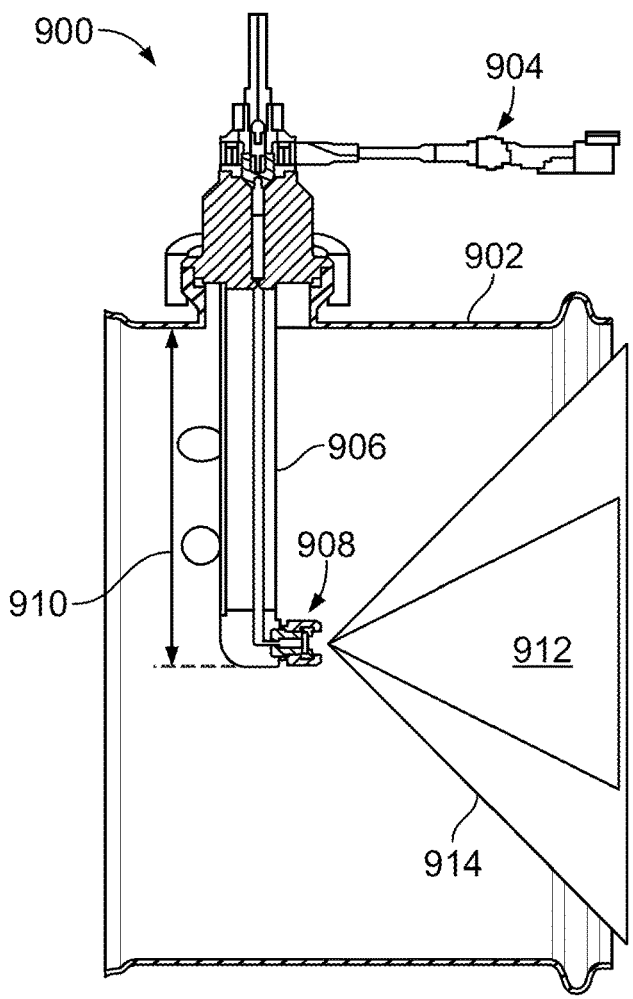
FIG. 9 is another cross-sectional view of the example liquid only lance injector assembly shown in FIG. 5.
Figure 10:
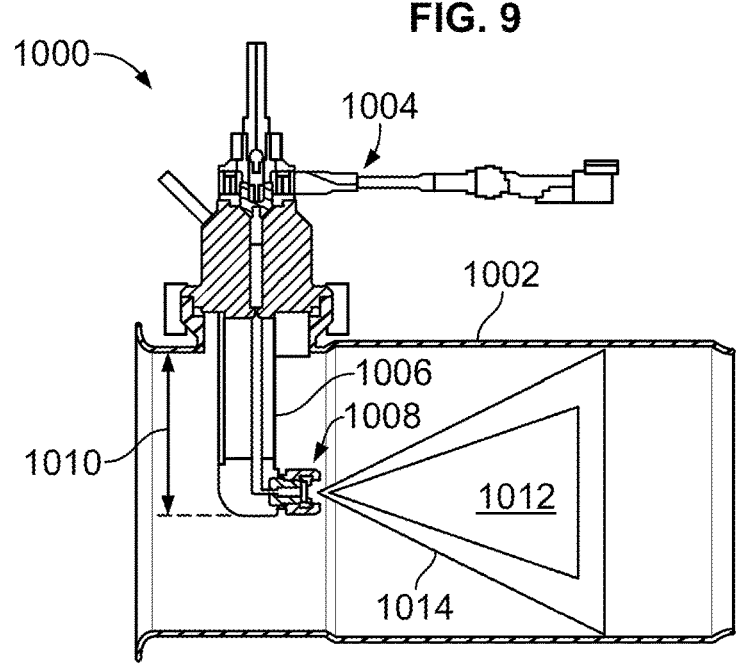
FIG. 10 is another cross-sectional view of the example liquid only lance injector assembly shown in FIG. 5.

FIGS. 8-10 illustrate cross-sectional views of liquid only lance injector assemblies 800-1000 similar to the lance injector assembly 500 depicted in FIGS. 5-7. For example, lance injector assemblies 800-1000 may represent embodiments of the lance injector assembly 500 scaled for mixers of various sizes. Referring now to FIG. 8, a lance injector assembly 800 is depicted. The lance injector assembly 800 may be utilized, for example, with an exhaust pipe 802 having a diameter of approximately 13 inches. A remote actuator 804 is shown to be mounted on the exterior of the exhaust pipe 802. A shaft 806 is coupled to the remote actuator 804 and extends into the interior of the exhaust pipe 802 in order to expel reductant from a nozzle and actuation assembly 808. In some embodiments, the distance 810 that the shaft 806 extends into the exhaust pipe 802 is approximately half the diameter of the exhaust pipe 802. In other words, the shaft 806 may extend to the centerline of the exhaust pipe 802. Thus, for example, when the exhaust pipe has a diameter of 13 inches, the distance 810 is approximately 6.5 inches.

The nozzle and actuation assembly 808 may be configured to emit a spray of reductant having a substantially cone-like shape. In various embodiments, the shape of the reductant spray emitted by the nozzle and actuation assembly 808 may have a first cone shape 812 or a second cone shape 814. The spray cone angle may be selected to best match the dimensions of the mixer and the exhaust pipe 802 while minimizing the amount of reductant coming into direct contact with the exhaust pipe 802. In other embodiments, the nozzle and actuation assembly 808 may emit a spray of reductant having any other desired geometry.

Referring now to FIG. 9, a lance injector assembly 900 is depicted. The lance injector assembly 900 may be utilized, for example, with an exhaust pipe 902 having a diameter of approximately 10.5 inches. A remote actuator 904 is shown to be mounted on the exterior of the exhaust pipe 902. A shaft 906 is coupled to the remote actuator 904 and extends into the interior of the exhaust pipe 902 to expel reductant from a nozzle and actuation assembly 908. Shaft 906 may extend to the centerline of the exhaust pipe 902, a distance 910 of approximately 5.25 inches. Similar to the nozzle and actuation assembly 808 of the lance injector assembly 800, the nozzle and actuation assembly 908 may be configured to emit reductant spray in a first cone shape 912 or a second cone shape 914.

Turning now to FIG. 10, a lance injector assembly 1000 is depicted. The lance injector assembly 1000 may be utilized with an exhaust pipe 1002 having a diameter of approximately 5 inches. A remote actuator 1004 is shown to be mounted on the exterior of the exhaust pipe 1002. A shaft 1006 is coupled to the remote actuator 1004 and extends into the interior of the exhaust pipe 1002 to expel reductant from a nozzle and actuation assembly 1008. Shaft 1006 may extend to the centerline of the exhaust pipe 1002, or a distance 1010 of approximately 2.5 inches. Similar to the nozzle and actuation assemblies 808 and 908, the nozzle and actuation assembly 1008 may be configured to emit a reductant spray in a first cone shape 1012 or a second cone shape 1014.

Referring now to FIGS. 11-23, various hydraulically-actuated nozzle assemblies are depicted. The nozzle and actuation assemblies depicted herein may be utilized with the lance injector assembly 500 as depicted in FIGS. 5-7. Each of the examples depicted in FIGS. 11-23 may be actuated without the use of any electronics located within the lance portion (i.e., shaft 504) of the lance assembly 500. However, with sufficient cooling and insulation, electronic actuators (e.g., solenoid valves, piezo-electric valves) may be utilized within the lance to control a flow of reductant from the lance injector assembly 500.

Figure 11:
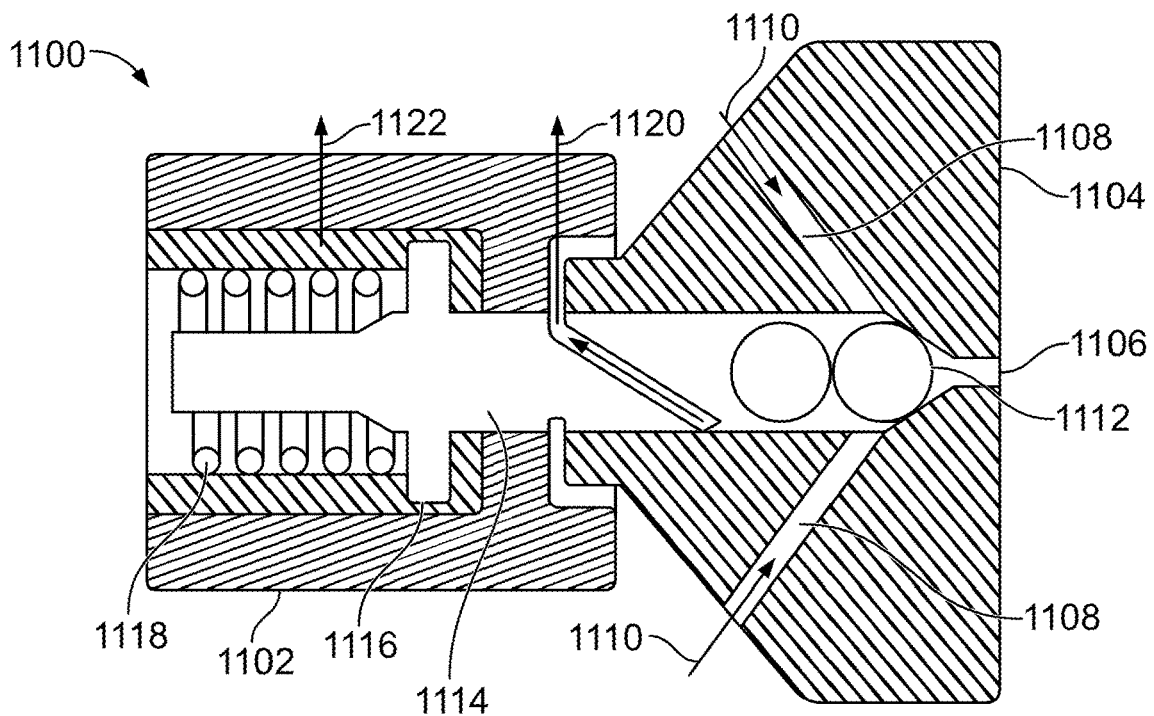
FIG. 11 is a cross-sectional view of a hydraulic actuator assembly for a liquid only lance, such as the example liquid only lance injector assembly shown in FIG. 5.
Figure 12:
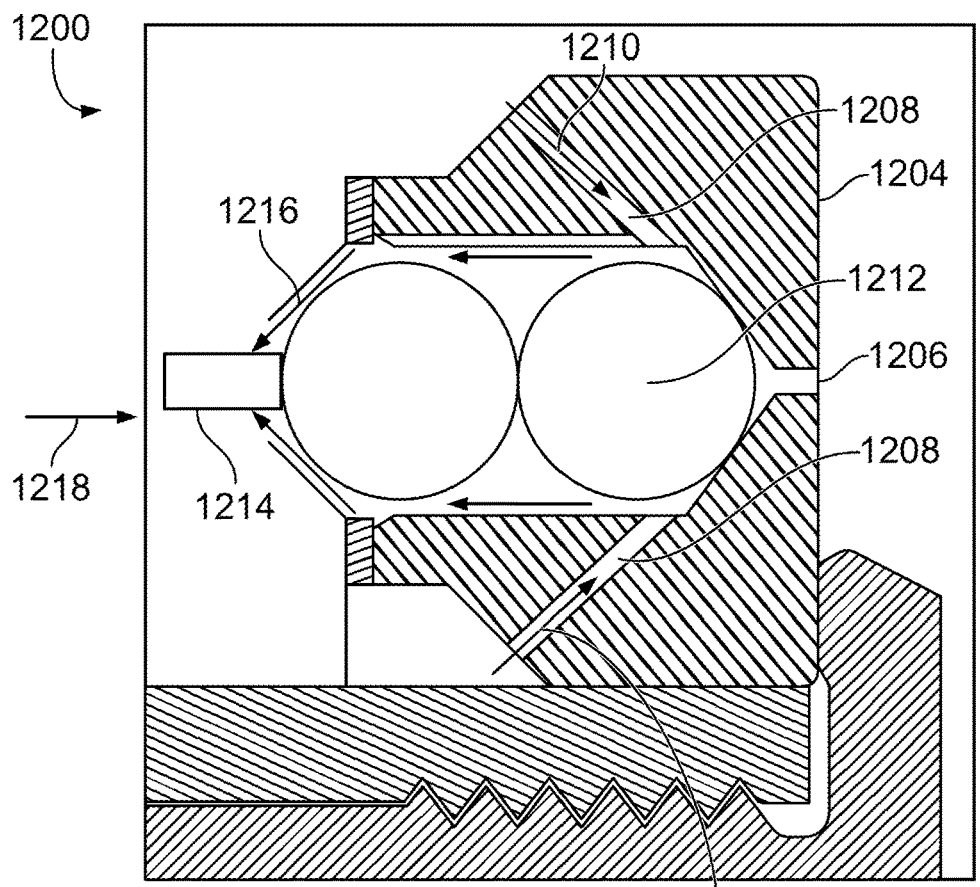
FIG. 12 is a cross-sectional view of another hydraulic actuator assembly for a liquid only lance, such as the example liquid only lance injector assembly shown in FIG. 5.

Turning now to FIGS. 11 and 12, examples of hydraulic actuator assemblies 1100 and 1200 for a liquid only lance are depicted. Actuator assembly 1100 is shown to include an inner body 1102 and a nozzle body 1104. In operation, a supply 1110 of reductant may pass through one or more supply passages 1108 of the nozzle body 1104 toward a nozzle outlet 1106. The nozzle outlet 1106 may be blocked by one or more valve members 1112 that are nominally seated against the nozzle outlet 1106. The preload force to hold the valve members 1112 against the nozzle outlet 1106 may be provided by a spring 1118 acting upon a needle shaped member 1114 that contacts one or more of the valve member 1112. In some embodiments, the needle shaped member 1114 includes a shoulder portion 1116, and the spring 1118 acts directly upon the shoulder portion 1116.

When the hydraulic actuator assembly 1100 is operating in a recirculation mode (i.e., the pressure of the supply 1110 is insufficient to overcome the preload supplied by the spring 1118), the supply 1110 of reductant may travel around the valve members 1112, through the needle shaped member 1114 and return to a reductant supply source using a return passage 1120. When the hydraulic actuator assembly 1100 is operating in an injection mode (i.e., the pressure of the supply 1110 is sufficient to overcome the preload supplied by the spring 1118), the supply 1110 forces the valve members 1112 off their seated position, permitting a portion of the supply 1110 to exit the nozzle body 1104 through the nozzle outlet 1106. The portion of the supply 1110 that does not exit the nozzle body 1104 may flow past the valve members 1112 and the needle shaped member 1114 to exit to the reductant supply source using a return passage 1122.

FIG. 12 depicts a hydraulic actuator assembly 1200 similar to the hydraulic actuator assembly 1100 in greater detail. As shown, a supply 1210 of reductant may be provided to a nozzle body 1204 using one or more supply passages 1208. A nozzle outlet 1206 may be blocked by one or more valve members 1212 that are nominally seated against the nozzle outlet 1206. A preload force 1218 to hold the valve members against the nozzle outlet 1206 may be provided by a preload member 1214. In some embodiments, the preload member 1214 includes a spring. When the pressure of the supply 1210 is sufficiently raised (i.e., by the remote actuator 508) to overcome the preload force 1218, the supply 1210 forces the valve members 1212 away from their seated position blocking flow from the nozzle outlet 1206, permitting a portion of the supply 1210 to flow from the nozzle outlet 1206. A second portion 1216 of the reductant may flow around the valve members 1212 to act directly upon the preload member 1214 in opposition to the preload force 1218.

Figure 13:
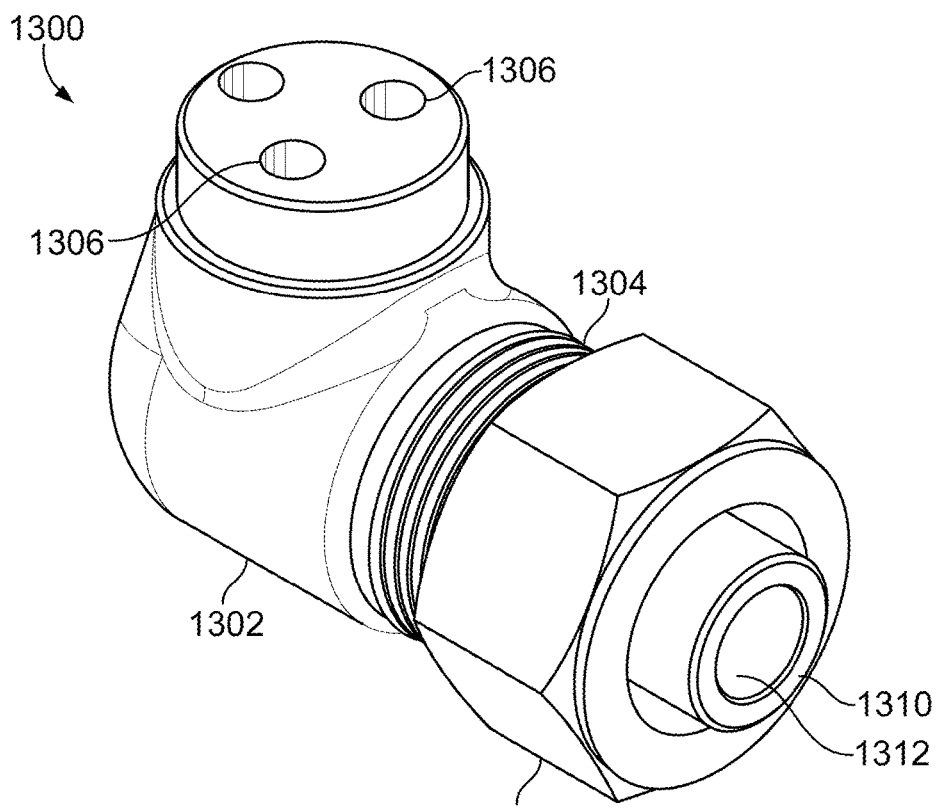
FIG. 13 is a perspective view of a full length direct needle lift nozzle assembly for a liquid only lance, such as the example liquid only lance injector assembly shown in FIG. 5.
Figure 14:
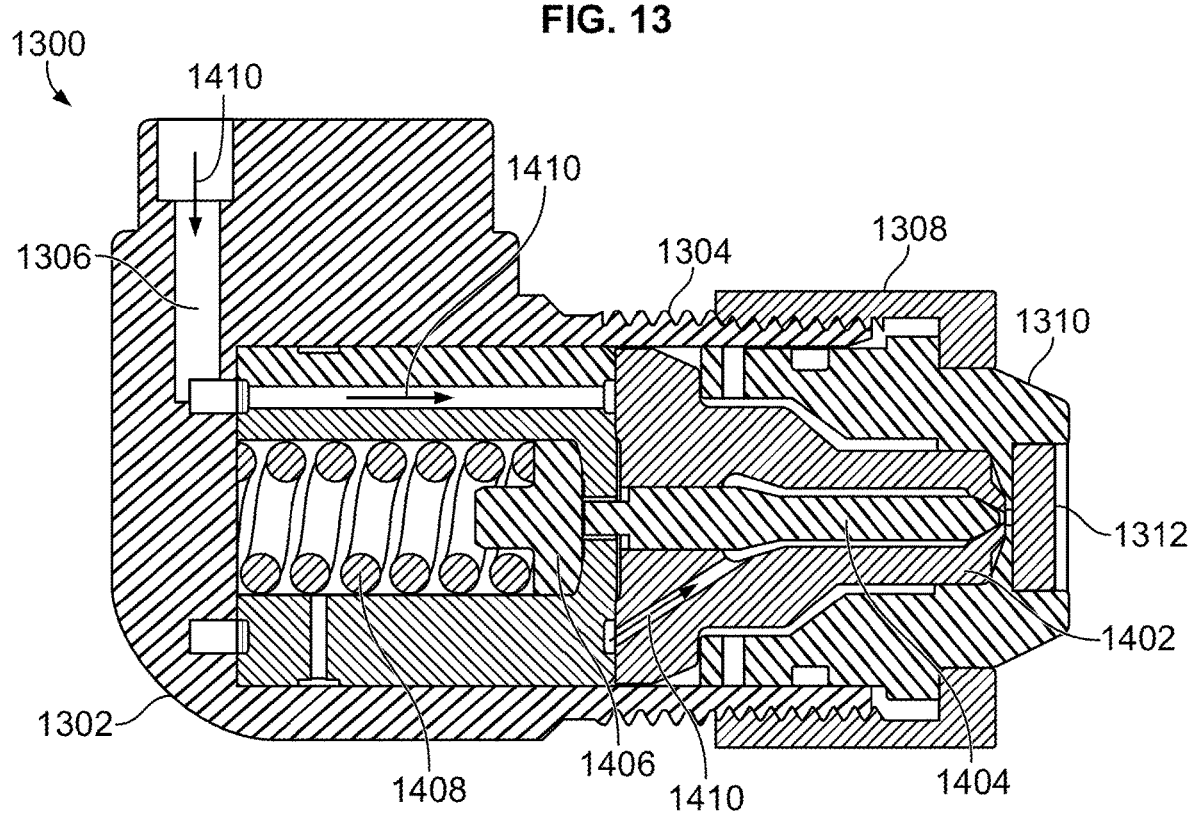
FIG. 14 is a cross-sectional view of the full length direct needle lift nozzle assembly shown in FIG. 13.

Referring now to FIGS. 13 and 14, perspective and cross-sectional views of a full length hydraulic actuator assembly 1300 are respectively shown. Hydraulic actuator assembly 1300 is shown to include a main body 1302 with an external threaded portion 1304. A nut 1308 may be threadably coupled to the threaded portion 1304 in order to retain one or more components of the actuator assembly 1300 within the main body 1302. In other embodiments, nut 1308 may be coupled to main body 1302 using a welding process. The main body 1302 is further shown to include multiple passages 1306. Passages 1306 may be configured to house supply and cooling lines (e.g., supply line 510, cooling lines 512, 514 depicted in FIG. 5). Reductant flowing through the supply line may exit the actuator assembly 1300 through an outer nozzle body 1310 and around or through a nozzle disc 1312. The nozzle disc 1312 may include any desired geometry (e.g., number and pattern of orifices) to produce a flow of reductant from the lance assembly having a desired shape.

The interior of the hydraulic actuator assembly 1300 as depicted in FIG. 14 is shown to include an inner nozzle body 1402 and a needle member 1404. The needle member 1404 may nominally block a flow of reductant through the outer nozzle body 1310 and the nozzle disc 1312 due to the application of a preload force applied by a preload member 1406 and a spring 1408. When injection is desired, a pressurized supply 1410 flows through the inner nozzle body 1402 and forces the needle member 1404 in opposition to the preload force (i.e., to the left, as depicted in FIG. 14), permitting a portion of the supply 1410 to exit the assembly 1300.

Figure 15:
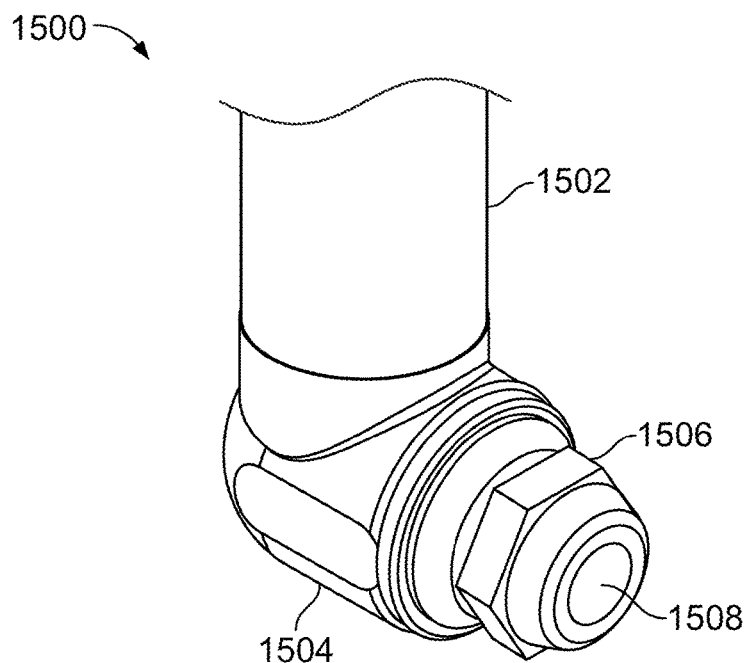
FIG. 15 is a perspective view of a shortened length direct needle lift nozzle assembly for a liquid only lance, such as the example liquid only lance injector assembly shown in FIG. 5.
Figure 16:
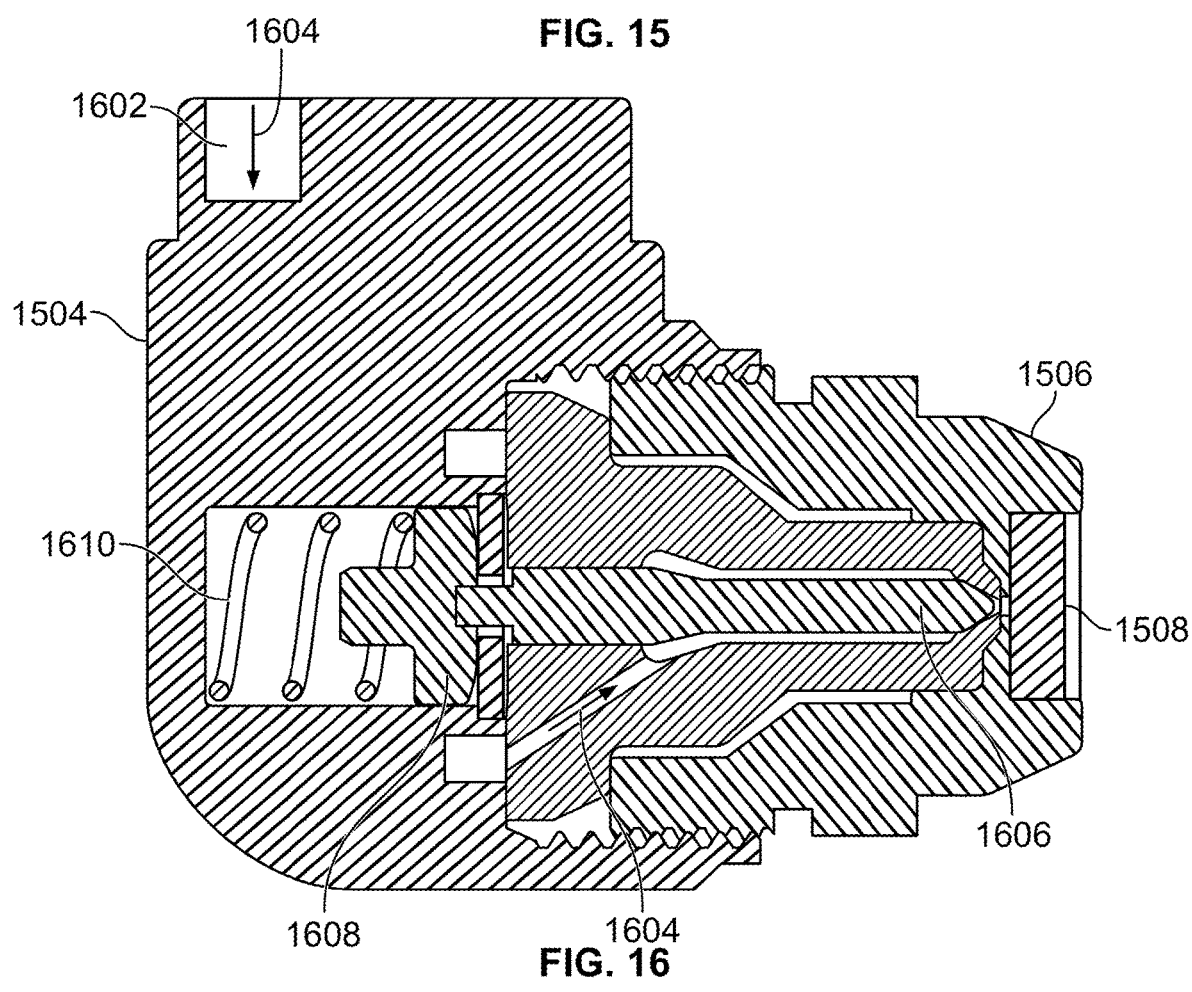
FIG. 16 is a cross-sectional view of the shortened length direct needle lift nozzle assembly shown in FIG. 15.

Turning now to FIGS. 15 and 16, perspective and cross-sectional views of a reduced length hydraulic actuator assembly 1500 are respectively shown. The reduced length assembly hydraulic actuator assembly 1500 may provide several advantages over the full length assembly 1300 depicted in FIGS. 13 and 14, namely a reduction in the size of the exhaust pipe opening required to install and mount the lance. Hydraulic actuator assembly 1500 is shown to include a shaft portion 1502 coupled to a main body 1504. An integrated nut and outer nozzle body 1506 may be threadably coupled to the main body 1504 to retain one or more components of the actuator assembly 1500 within the main body 1504. Reductant supply through a supply line (not shown) disposed within the shaft 1502 may exit the actuator assembly 1500 through the integrated nut and outer nozzle body 1506 and around or through a nozzle disc 1508.

The interior of the hydraulic actuator assembly 1500 as depicted in FIG. 16 is shown to include a needle member 1606. The needle member 1606 may nominally block a flow of reductant through the nozzle body 1506 and the nozzle disc 1508 due to the application of a preload force applied by a preload member 1608 and a spring 1610. When injection is desired, a pressurized supply 1604 flows from a supply passage 1602 and forces the needle member 1606 in opposition to the preload force, permitting a portion of the supply 1604 to exit the assembly 1500.

Figure 17:
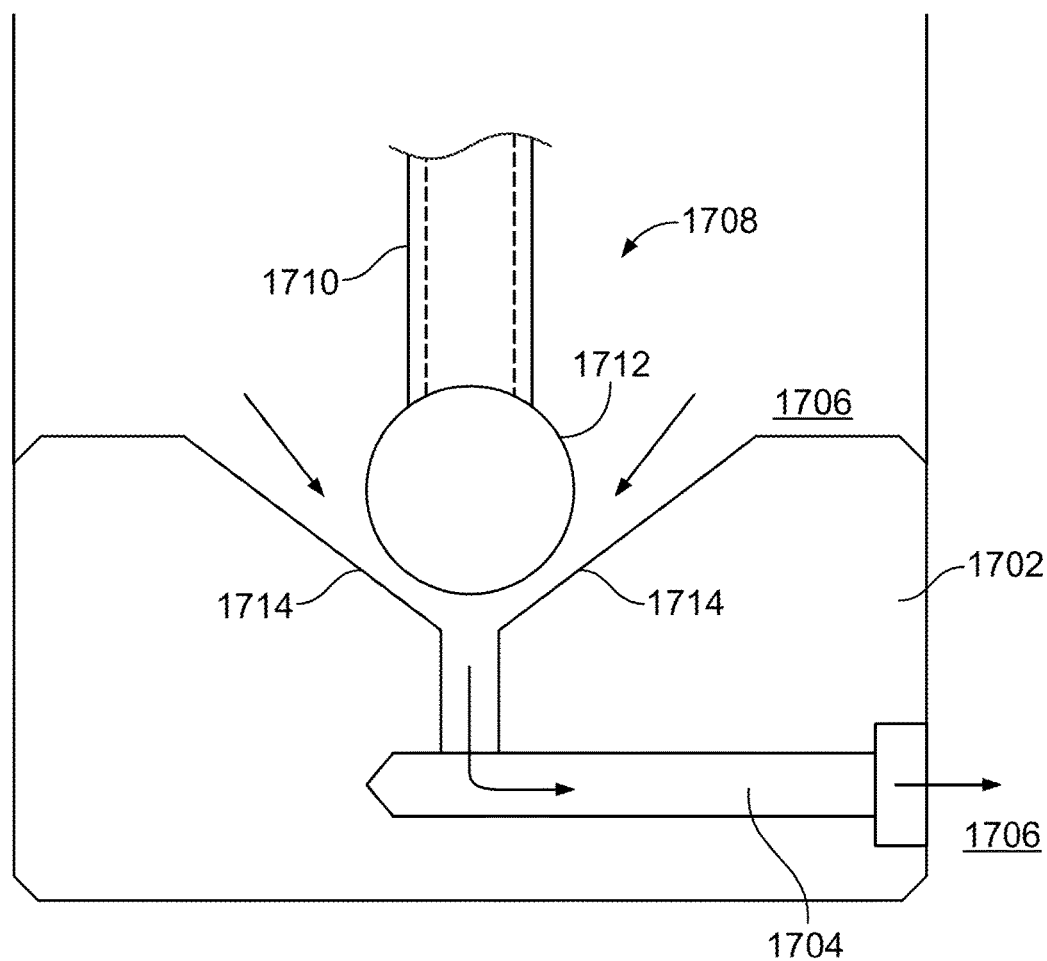
FIG. 17 is a cross-sectional view of a direct actuation nozzle assembly for a liquid only lance, such as the example liquid only lance injector assembly shown in FIG. 5.

FIG. 17 depicts a cross-sectional view of a direct actuation assembly 1700. The direct actuation assembly 1700 includes a nozzle body 1702 with a nozzle passage 1704. Control of a supply flow 1706 of reductant through the nozzle passage 1704 may be achieved through vertical movement of a shaft assembly 1708. The shaft assembly 1708 may include a shaft member 1710 and a ball member 1712. When the ball member 1712 is flush against a seat orifice 1714, the supply flow 1706 may be blocked from travel through the nozzle passage 1704. However, when the ball member 1712 is lifted from the seat orifice 1714 (e.g., through operation of a remote actuator such as remote actuator 508), the supply flow 1706 may flow around the ball member 1712 and exit the lance assembly through the nozzle passage.

Figure 19:
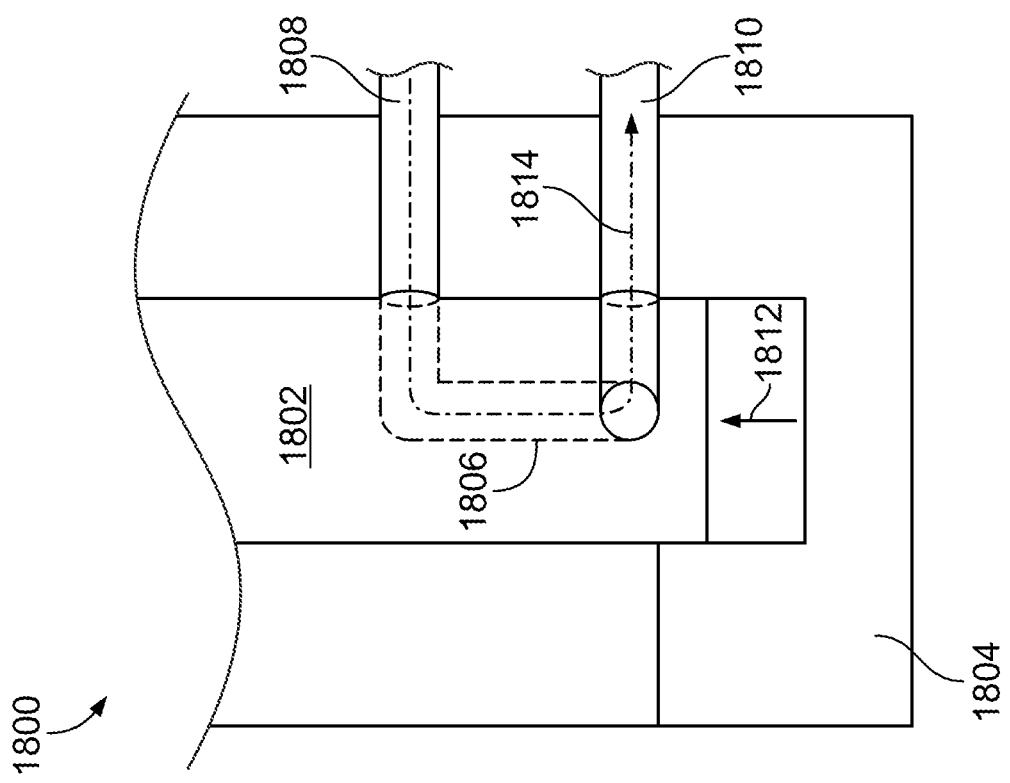
FIG. 19 is a cross-sectional view of the gate valve actuation assembly of FIG. 19 in an open position.
Figure 18:
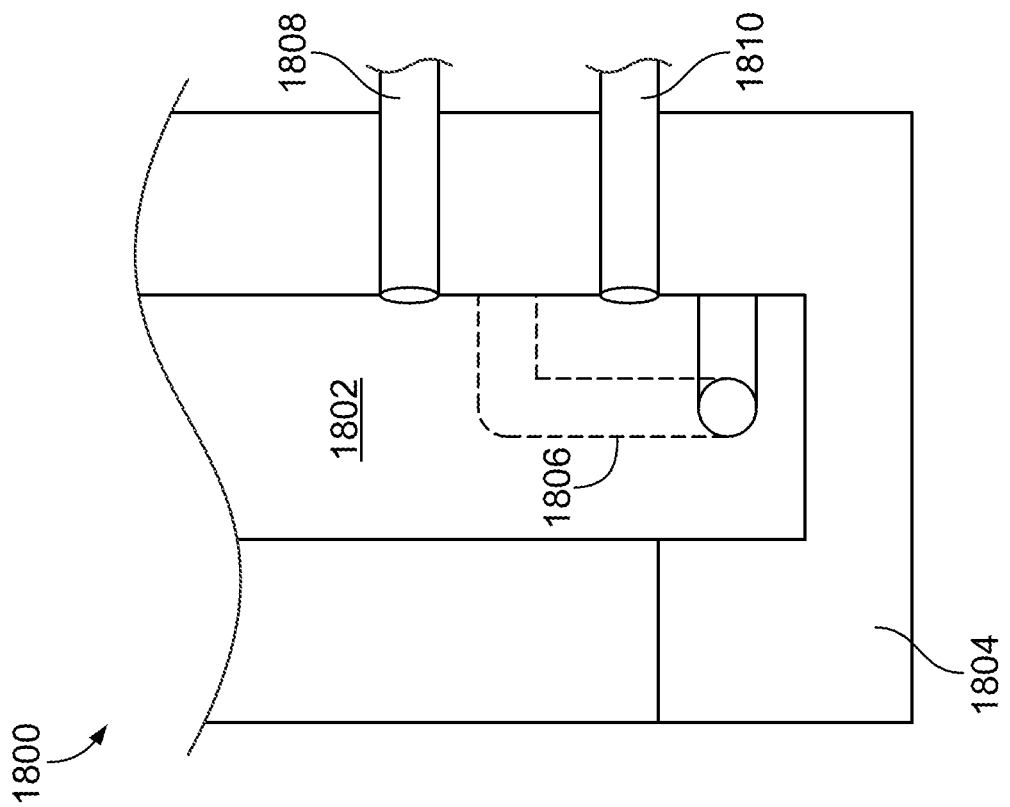
FIG. 18 is a cross-sectional view of a gate valve actuation assembly in a closed position for a liquid only lance, such as the example liquid only lance injector assembly shown in FIG. 5.

FIGS. 18 and 19 illustrate cross-sectional views of a gate valve assembly 1800 in a closed position and an open position, respectively. The gate valve assembly 1800 is shown to include a shaft member 1802 configured to travel in a vertical direction. When the gate valve assembly 1800 is in the closed position, the shaft member 1802 may rest flush against a valve seat 1804. The shaft member 1802 is shown to include an interior fluid passage 1806 having a substantially U-shaped geometry. In other embodiments, the interior fluid passage 1806 may have any other desired geometry. In the closed position, as depicted in FIG. 18, the interior fluid passage 1806 may be positioned such that the interior fluid passage 1806 is out of alignment with both a supply passage 1808 and a discharge passage 1810. However, when the shaft member 1802 is lifted (e.g., through operation of a remote actuator) by a distance 1812 as depicted in FIG. 19, the interior fluid passage 1806 may be moved into alignment with both the supply passage 1808 and a discharge passage 1810, and a supply of reductant 1814 may flow from the supply passage 1808, through the interior fluid passage 1806, and out through the discharge passage 1810.

Figure 20:
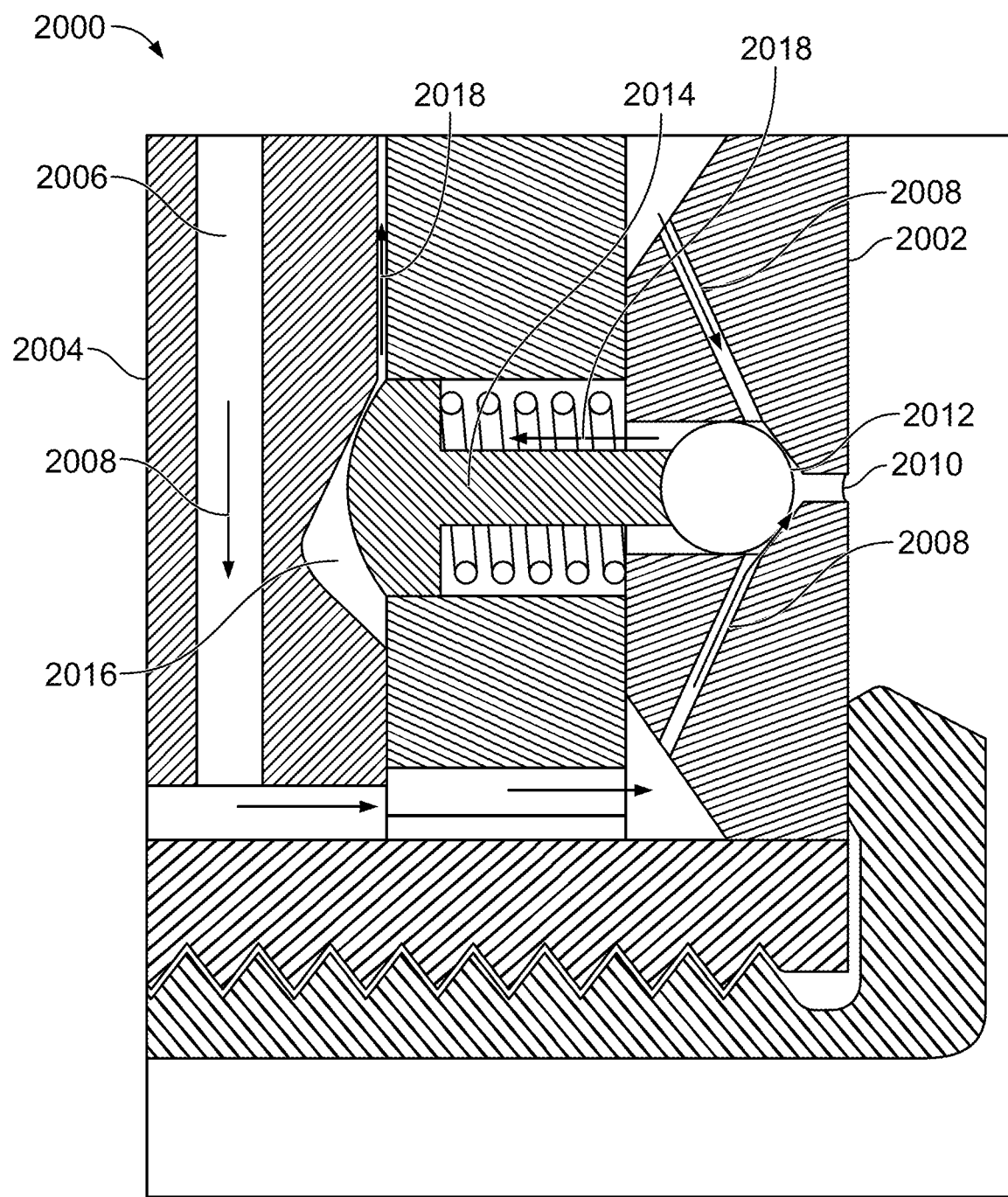
FIG. 20 is a cross-sectional view of a mechanical actuator assembly for a liquid only lance, such as the example liquid only lance injector assembly shown in FIG. 5.

Turning now to FIG. 20, a cross-sectional view of a mechanical actuator assembly 2000 is depicted. The mechanical actuator assembly 2000 is shown to include a nozzle body 2002 and a movable shaft component 2004 with a supply passage 2006 for a supply flow 2008 of reductant. The supply flow 2008 may be nominally blocked from exiting a nozzle outlet 2010 of the nozzle body 2002 by a valve member 2012. The valve member 2012 may be retained in the nominal position by a preload member 2014. In some embodiments, the valve member 2012 is inseparably coupled to the preload member 2014.

When injection flow from the assembly 2000 is desired, the movable shaft component 2004 may travel vertically upwards (e.g., through operation of a remote actuator) such that the preload member 2014 travels leftwards into the recess 2016 of the shaft component 2004. This relief of the preload force against the valve member 2012 permits the supply flow 2008 to travel past the valve member 2012 and exit the assembly 2000 through the nozzle outlet 2010. In some embodiments, some portion 2018 of reductant not travelling through the nozzle outlet 2010 may flow past the preload member 2014 and return to a reductant supply source.

In some embodiments, liquid only lance injector assemblies may be configured to provide air insulation to reductant flowing through a supply line of the lance injector assembly such that liquid cooling is not needed. Such lance injector assemblies do not have any coolant lines, for example, reductant return lines to provide cooling. For example, FIGS. 21 and 22 are various views of a liquid only lance injector assembly 2100, according to an embodiment. The lance injector assembly 2100 includes a shaft 2104 configured to extend into an exhaust conduit of an aftertreatment system. The shaft 2104 is hollow and defines a channel therethrough. The shaft 2104 may have an inner diameter in a range of 0.5 inches to 1.5 inches (e.g., 0.5, 0.6, 0.7, 0.8, 0.9, 1.0, 1.1, 1.2, 1.3, 1.4, or 1.5 inches, inclusive). Air is present between the shaft 2104 and the supply line 2110 such that air insulation is provided around the supply line 2110 which inhibits heat transfer from the shaft 2104 to the supply line 2110 and the reductant flowing therethrough.

A cap 2116 is disposed on and coupled to a first end of the shaft 2104. The cap 2116 may have a substantially solid structure. A supply line 2110 extends through the cap 2116 and is disposed in the channel defined by the shaft 2104. The supply line 2110 extends beyond a second end of the shaft 2104 that is opposite the first end. A bend 2111 is defined in the supply line 2110 proximate to a second end 2105 of the shaft 2104 opposite the first end such that a portion of the supply line 2110 that extends beyond the second end of the shaft 2104 and is configured to be exposed to a flow path of an exhaust gas is substantially perpendicular to an upstream portion of the supply line 2110. A dosing module 2114 is fluidly coupled to an upstream end of the supply line 2110 and configured to provide a reductant to the supply line 2110. An adapter 2102 defining a nozzle is coupled to a downstream end of the supply line 2110 located distal from the bend 2111 and is configured to insert a stream, jet, or spray of the reductant into the exhaust gas. FIG. 22 shows the lance injector assembly 2100 with a bottom portion of the shaft 2104 removed. As shown in FIG. 22, the supply line 2110 extends through the shaft 2104 proximate to longitudinal axis of the shaft 2104. The downstream end of the supply line 2110 extends through a wall of the shaft 2104 such that the adapter 2102 is disposed outside the shaft 2104.

As described above, the lance injector assembly 2100 and the other lance injector assemblies described with respect to FIGS. 23-32 do not include DEF coolant lines. This reduces complexity of the assembly 2100, reduces manufacturing cost, inhibits temperature increase in an upstream reductant storage tank which may happen due to return of heated reductant via reductant return lines, and removes problems with failure of lance injector assemblies due to reductant deposit formation in reductant return lines. Additionally, the lance injector assembly 2100 and the other lance injector assemblies described with respect to FIGS. 23-32 do not include a solid elbow and instead, include an empty air cavity to reduce the thermal mass and hence, improve thermal performance. Moreover, cost is further reduced by excluding a check valve which beneficially also reduces thermal mass.

Figure 25:
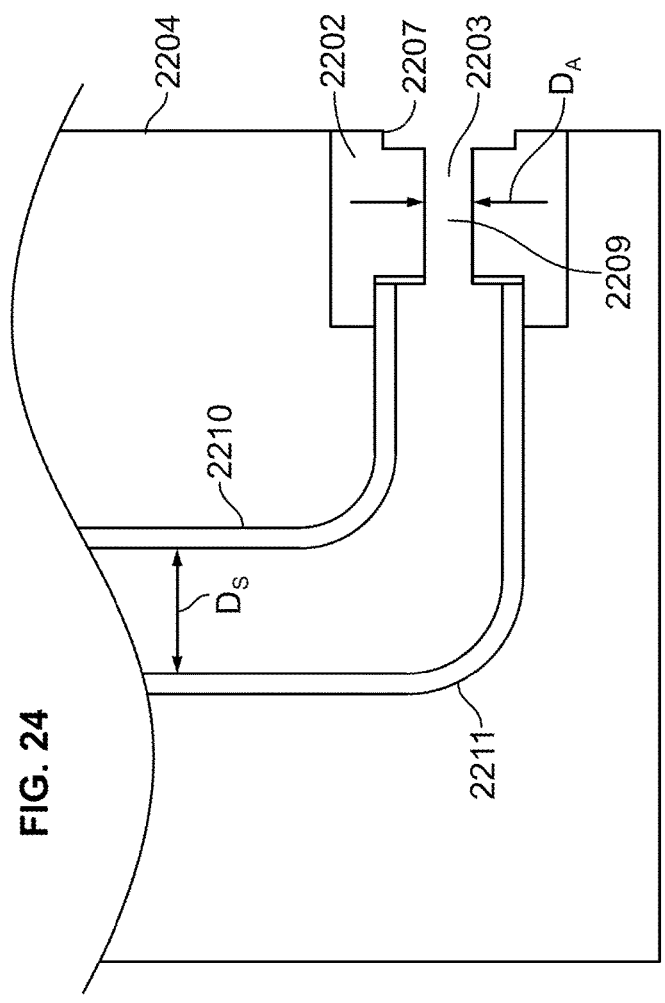
FIG. 25 is a schematic illustration of a portion of lance injector assembly showing an adapter and a nozzle included in the liquid only lance injector assembly of FIG. 23.
Figure 24:
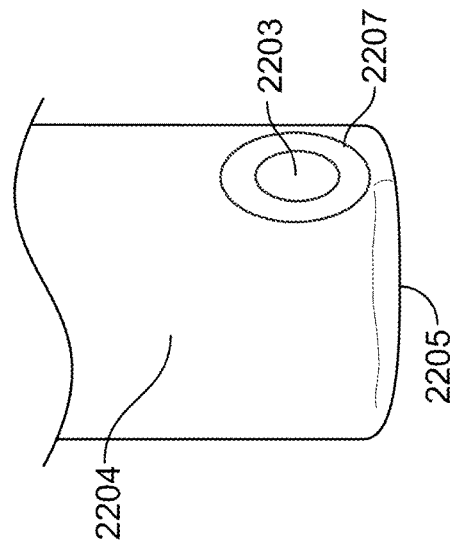
FIG. 24 is a side view of a portion of the liquid only lance injector assembly of FIG. 23 indicated by the arrow B in FIG. 23.
Figure 23:
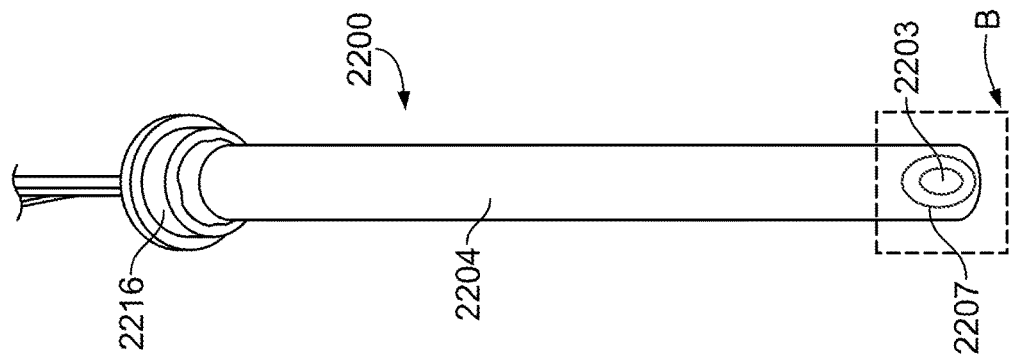
FIG. 23 is a side perspective view of a liquid only lance injector assembly, according to an embodiment.

Referring to FIGS. 23-25, a liquid only lance injector assembly 2200 is shown, according to another embodiment. The liquid only lance injector assembly 2200 includes a shaft 2204 configured to provide air insulation, as previously described. A cap 2216 is disposed on and coupled to a first end of the shaft 2204. The shaft 2204 may have an inner diameter Ds in a range of 1 inches to 2 inches (e.g., 1.0, 1.1, 1.2, 1.3, 1.4, 1.5, 1.6, 1.7, 1.8, 1.9, or 2.0 inches, inclusive). The cap 2216 may have a substantially solid structure. A supply line 2210 extends through the cap 2216 and is disposed in the channel defined by the shaft 2204. A bend 2211 is defined in the supply line 2210 such that a portion of the supply line 2210 that is located proximate to a downstream end 2205 of the shaft 2204 that is located opposite the cap 2216, is substantially perpendicular to an upstream portion of the supply line 2210. An opening 2207 is defined in a wall of the shaft 2204 proximate to a second end 2205 of the shaft 2204 that is opposite the first end. A nozzle 2203 is disposed at a downstream end of the supply line 2210. The nozzle 2203 is coupled to the shaft 2204 around the opening 2207 such that reductant is able to flow from the nozzle 2203 through the opening 2207 and into an exhaust gas flowing through the exhaust conduit.

In some embodiments, the nozzle 2203 is disposed on or defined by an adapter 2202 that is coupled to the downstream end of the supply line 2110. The adapter 2202 may be coupled fluidly coupled to or alternatively, may extend through the opening 2207 defined in a wall of the shaft 2204. In some embodiments, the opening 2207 may be defined at a distance of about 1 inches to 2 inches from the downstream end 2205 of the shaft 2204 (e.g., between 1.0, 1.1, 1.2, 1.3, 1.4, 1.5, 1.6, 1.7, 1.8, 1.9, or 2.0 inches, inclusive). As shown in FIG. 25, the adaptor 2202 defines an aperture 2209 having a constant aperture diameter DA upstream of the nozzle 2203.

Figure 27:
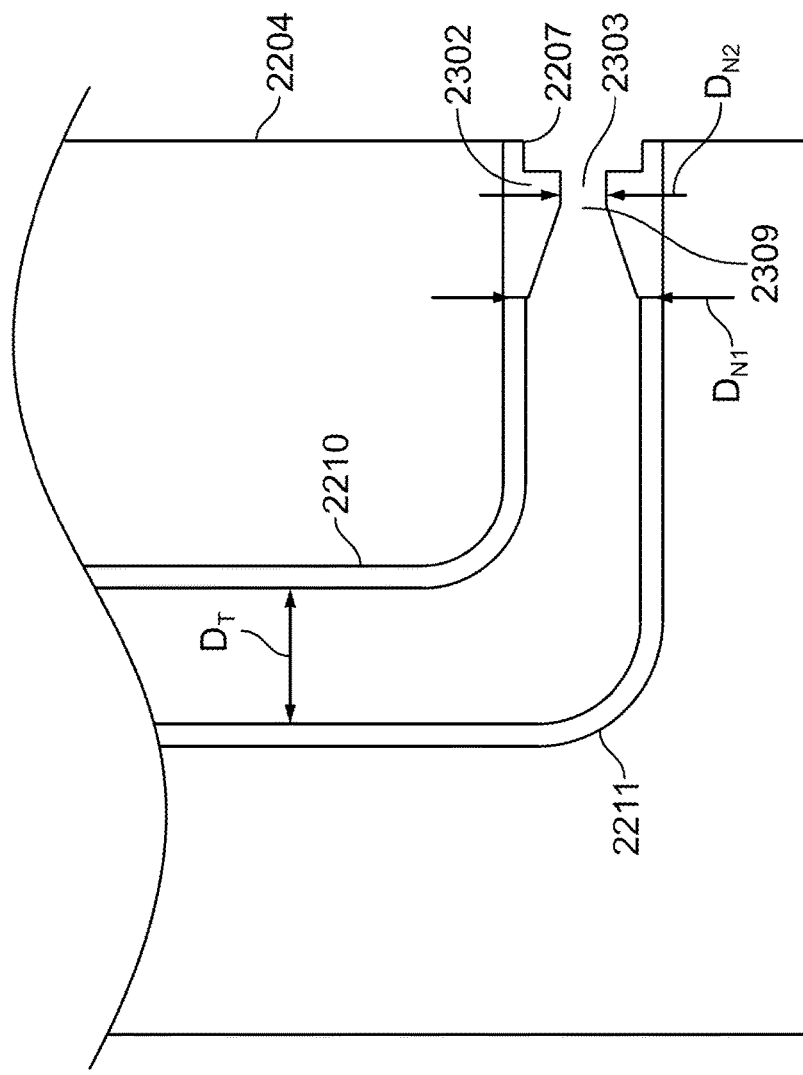
FIG. 27 is a schematic illustration of a portion of lance injector assembly showing an adapter and a nozzle included in the liquid only lance injector assembly of FIG. 26.
Figure 26:
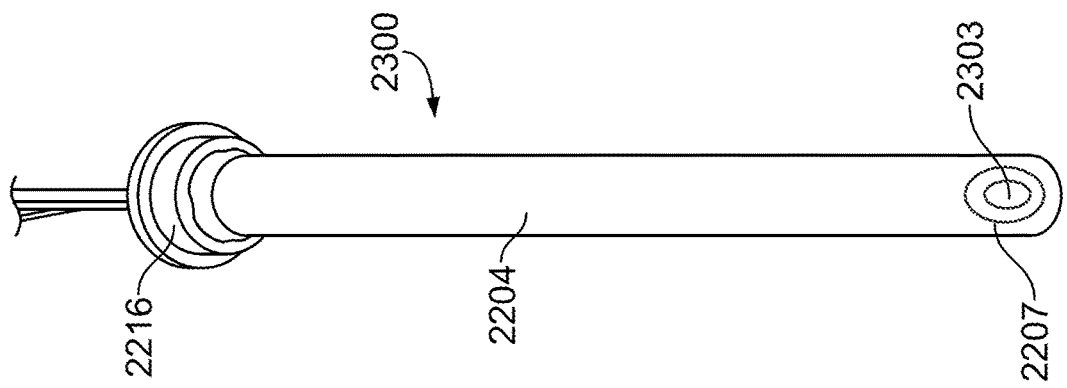
FIG. 26 is a side view of a liquid only lance injector assembly, according to an embodiment.

FIGS. 26 and 27 show a liquid only lance injector assembly 2300, according to another embodiment. The lance injector assembly 2300 is substantially similar to the lance injector assembly 2200 and includes similar components. However, different from the adapter 2202, the lance injector assembly 2300 includes an adapter 2302 fluidly coupled to a downstream end of the supply line 2210. The adapter 2302 defines an aperture 2309 upstream of the nozzle 2303. The aperture 2309 defines a first diameter DN1 proximate to the supply line 2210 and a second diameter DN2 smaller than the first diameter DN1 distal from the supply line 2210 (i.e., upstream of the nozzle 2303) such that the aperture 2309 tapers inwardly from the supply line 2210 towards the nozzle 2303. The first diameter DN1 may correspond to an inner diameter of the supply line 2210. The larger diameter upstream end of the adapter 2302 allows reductant to transition from the supply line 2210 to the adapter 2302 with minimal obstruction. This inhibits formation of reductant deposits which can clog the aperture 2309 and/or the nozzle 2303.

Figure 28:
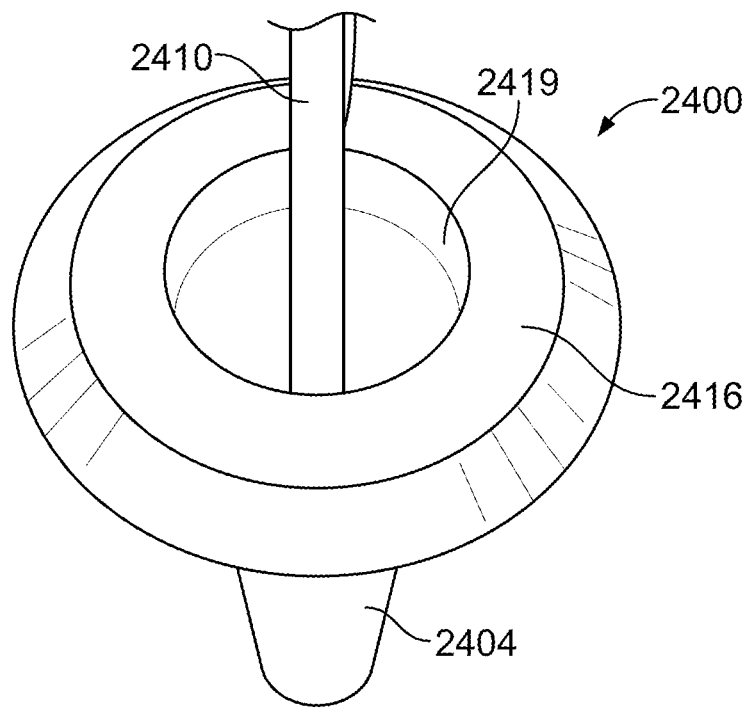
FIG. 28 is a top, side perspective view of a liquid only lance injector assembly, according to an embodiment.

FIG. 28 is a top, side perspective view of a liquid only lance injector assembly 2400, according to an embodiment. In various embodiments, the elements or components of the lance injector assembly 2400 can be used with any of the lance injector assemblies described 2100, 2200, 2300. The liquid only lance injector assembly 2400 includes a hollow shaft 2404 defining a channel, as previously described. In some embodiments, the shaft 2404 may have an inner diameter in a range of 1 inches to 2 inches (e.g., 1.0, 1.1, 1.2, 1.3, 1.4, 1.5, 1.6, 1.7, 1.8, 1.9, or 2.0 inches, inclusive). A cap 2416 is coupled to an upstream end of the shaft 2404 and defines a central opening 2419. A supply line 2410 extends into and is disposed in the channel defined by the shaft 2404 through the cap 2416. Because of the central opening 2419, the supply line 2410 does not contact the cap 2416 and heat transfer from the cap 2416 to the supply line 2410 and therefore, the reductant flowing through the supply line 2410, is inhibited.

Figure 29:
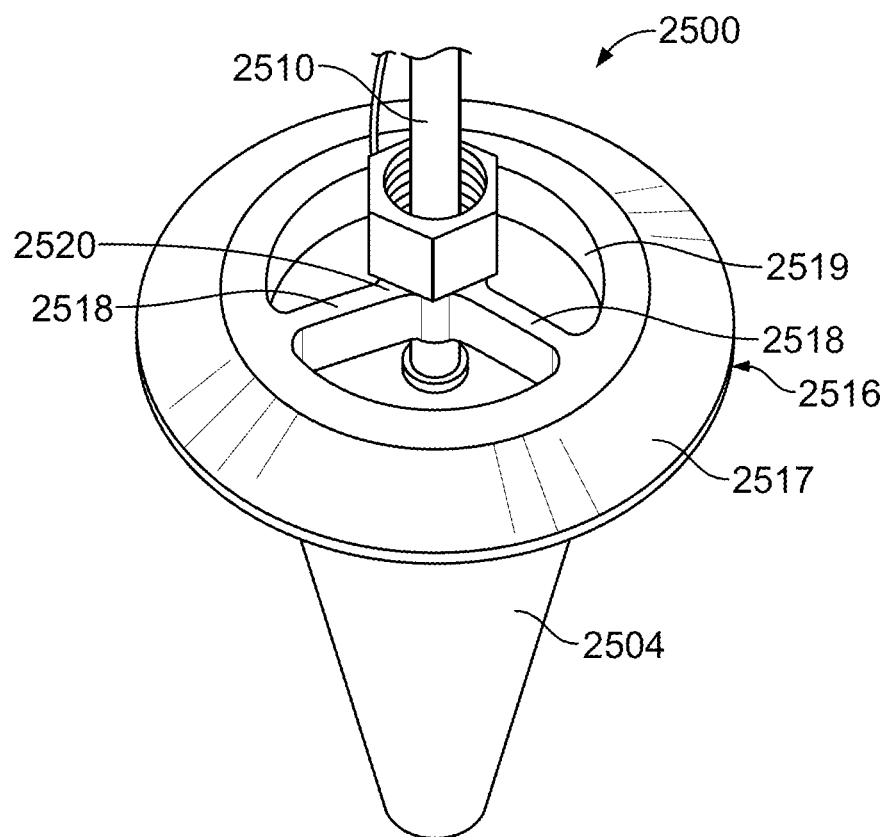
FIG. 29 is a top, side perspective view of a liquid only lance injector assembly, according to another embodiment.

FIG. 29 is a top, side perspective view of a liquid only lance injector assembly 2500, according to another embodiment. In various embodiments, the elements or components of the lance injector assembly 2500 can be used with any of the lance injector assemblies 2100, 2200, 2300. The liquid only lance injector assembly 2500 includes a hollow shaft 2504 defining a channel and configured to provide air insulation, as previously described. In some embodiments, the shaft 2504 may have an inner diameter in a range of 1 inches to 2 inches (e.g., 1.0, 1.1, 1.2, 1.3, 1.4, 1.5, 1.6, 1.7, 1.8, 1.9, or 2.0 inches, inclusive). A cap 2516 is coupled to an upstream end of the shaft 2504 and a supply line 2510 extends through the cap 2516 into the shaft 2504 and is disposed in the channel defined by the shaft 2504. The cap 2516 includes an annular portion 2517 and a central hub 2520 disposed circumferentially inwards of the annular portion 2517 around a longitudinal axis of the cap 2516. The central hub 2520 is coupled to the annular portion 2517 via radial ribs 2518 extending from an outer periphery of the central hub 2520 to an inner periphery of the annular portion 2517 such that gaps 2519 are defined between adjacent radial ribs 2518. The supply line 2510 extends through the central hub 2520 into the shaft 2504. The central hub 2520 serves to support the supply line 2510 as well as position the supply line 2510 substantially along a longitudinal axis of the shaft 2504. Since the annular portion 2517 is coupled to the central hub 2520 via only the radial ribs 2518, the ribs provide the only source of conductive heat transfer from the annular portion 2517 to the central hub 2520. Therefore heat transfer to the supply line 2510 is reduced relative to a solid cap.

Figure 31:
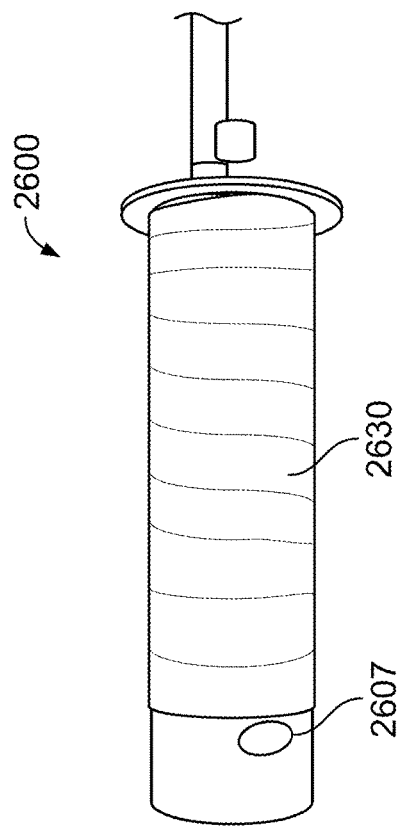
FIG. 31 is another side view of the liquid only lance injector assembly of FIG. 30 with an insulation layer disposed thereon.
Figure 32:
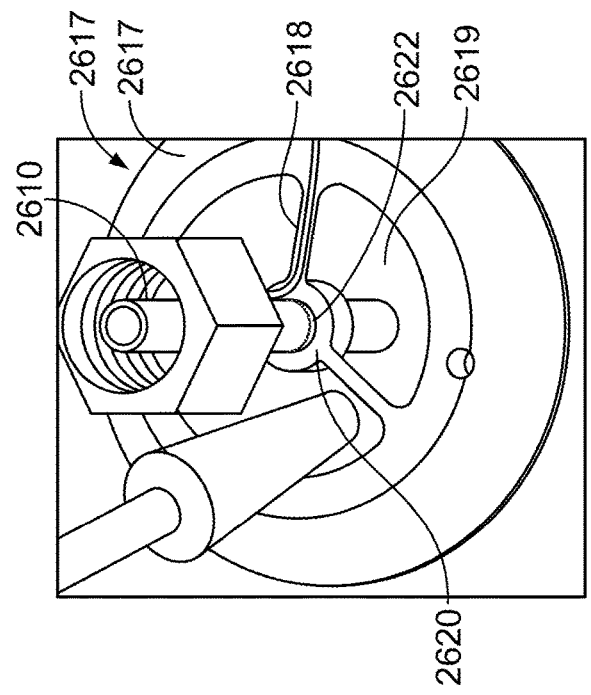
FIG. 32 is a top view of a cap included in the liquid only lance injector assembly of FIG. 30.
Figure 30:
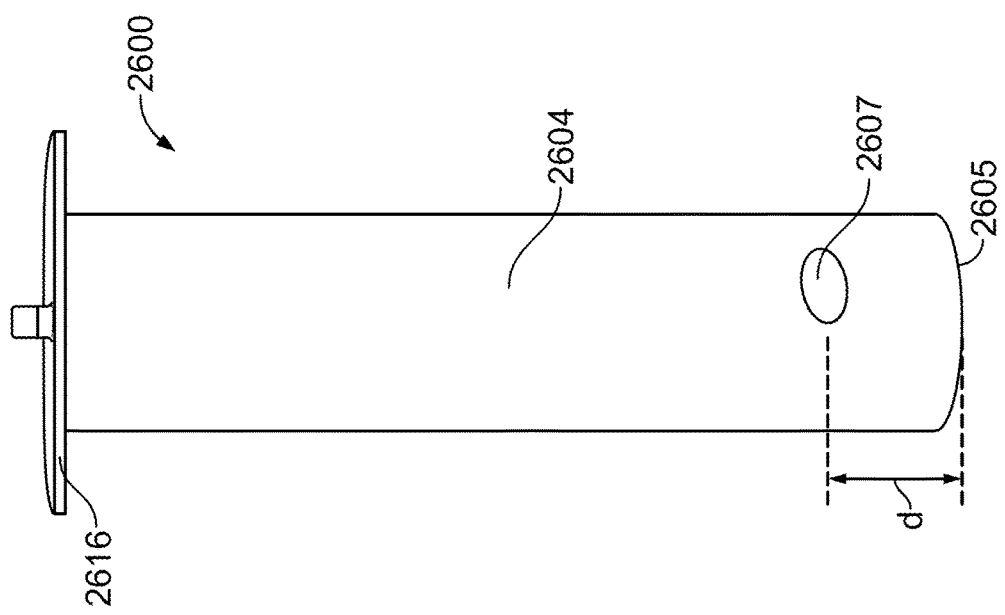
FIG. 30 is a side perspective view of a liquid only lance injector assembly, according to still another embodiment.

Referring to FIGS. 30-32, a liquid only lance injector assembly 2600 is shown, according to still another embodiment. In various embodiments, the elements or components of the lance injector assembly 28 can be used with any of the lance injector assemblies 2100, 2200, 2300. The liquid only lance injector assembly 2600 includes a hollow shaft 2604 defining a channel configured to provide air insulation, as previously described. In some embodiments, the shaft 2604 may have an inner diameter in a range of 1 inches to 2 inches (e.g., 1.0, 1.1, 1.2, 1.3, 1.4, 1.5, 1.6, 1.7, 1.8, 1.9, or 2.0 inches, inclusive) and a thickness in a range of 0.5 mm to 1 mm (e.g., 0.5, 0.6, 0.7, 0.8, 0.9, or 1.0 mm, inclusive). An opening 2607 is defined in a wall of a shaft 2604 at a distance in a range of 2 inches to 3 inches from a downstream or second end of shaft 2604 (e.g., between 2.0, 2.1, 2.2, 2.3, 2.4, 2.5, 2.6, 2.7, 2.8, 2.9, or 3.0 inches, inclusive). A nozzle or adapter defining the nozzle (e.g., the adapter 2202, 2302) may be fluidly coupled to or alternatively, may extend through the opening 2607. In some embodiments, an insulation layer 2630 is disposed around the shaft 2604, to inhibit heat transfer to the shaft 2604 and therefrom, the supply line 2610. Any suitable insulation material can be used to form the insulation layer 2630 such as, for example, fiber glass, textiles, polystyrene, etc.

A cap 2616 is coupled to a first or upstream end of the shaft 2604. A supply line 2610 extends through the cap 2616 into the shaft 2604 and is disposed in the channel defined by the shaft 2604. In some embodiments, the supply line 2610 may have an inner diameter in a range of 2.5 mm to 3.5 mm (e.g., 2.5, 2.6, 2.7, 2.8, 2.9, 3.0, 3.1, 3.2, 3.3, 3.4, or 3.5 mm, inclusive) and a thickness in a range of 0.5 mm to 1.5 mm (e.g., 0.5, 0.6, 0.7, 0.8, 0.9, 1.0, 1.1, 1.2, 1.3, 1.4, or 1.5 mm, inclusive). An inner surface of the supply line 2610 may be electropolished. The cap 2616 is substantially similar to the cap 2516, and includes an annular portion 2617 and a central hub 2620 with radial ribs 2618 extending from the hub 2620 to the annular portion 2617 such that gaps 2619 are defined between adjacent ribs. The supply line 2610 extends through the central hub 2620 into the shaft 2604. The central hub 2620 serves to support the supply line 2610 as well as position the supply line 2610 substantially along a longitudinal axis of the shaft 2604. Different from the cap 2516, an insulated bushing 2622 is positioned in the central hub 2620 around the portion of the supply line 2610 disposed in the central hub 2620 and is configured to inhibit heat transfer from the central hub 2620 to the supply line 2610.

The liquid only lance injector assembly 2600 was subjected to various repetitions of a testing cycle that included 30 minutes of reductant dosing, 5 minutes without reductant dosing, and then 30 minutes of reductant dosing (30-5-30 cycle). The various testing conditions that the lance injector assembly 2600 was tested at are listed in Table 1:

TABLE 1

| Lance injector assembly testing conditions | | | |
|---|---|---|---|
| Test Condition | Exhaust Gas Flow Rate (kg/min) | Exhaust Gas Temperature (Celsius) | Reductant Flow Rate (ml/sec) |
| Test Condition 1 | 10.5 | 210 | 0.23 |
| Test Condition 2 | 11.1 | 290 | 0.275 |
| Test Condition 3 | 18.3 | 345 | 0.59 |
| Test Condition 4 | 33.6 | 470 | 0.91 |

The measure of success for each test was that temperature of the reductant emitted from the lance injector assembly 2600 remained less than 70 degrees Celsius and the reductant did not clog the supply line 2610. The lance injector assembly 2600 passed multiple 30-5-30 cycles for each of the test conditions. The lance injector assembly 2600 even passed non-standard tests in which reductant is passed through the supply line at 0.03 ml/second at test condition 4 for 2 hours, at 0.09 ml/second at 550 degrees Celsius exhaust gas temperature for more than 1 hours, and at exhaust gas temperature of 550 degrees Celsius without dosing, and then dosing reductant at test condition 1, 2, 3, or 4. This indicates that the air insulation provided by the liquid only lance injector assembly 2600 significantly inhibits heat transfer from the shaft 2604 to the supply line 2610 and thereby, the reductant flowing therethrough. Thus, the lance injector assembly 2600 can inhibit reductant from decomposing within the supply line 2610 even at very high operating temperatures of the exhaust gas as well as inhibit reductant deposit formation, thereby increasing the operational life of the lance injector assembly 2600.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," "fastened," "fixed," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled," "fluidly communicable with," and the like, as used herein, mean the two components or objects have a pathway formed between the two components or objects in which a fluid, such as air, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

What is claimed is:

1. A lance injector assembly for an exhaust component, the lance injector assembly comprising:
   an exhaust conduit;
   a shaft configured to extend into the exhaust conduit and dispense reductant from a hydraulically-actuated valve;
   an actuator configured to operate the hydraulically-actuated valve; and
   a mounting system that couples the actuator and the shaft to the exhaust conduit while preventing the actuator from directly contacting the exhaust conduit, the mounting system comprising:
   a spacer component coupled to and surrounding a portion of the shaft that is disposed outside the exhaust conduit, the spacer component coupled to the exhaust conduit,
   an inner cap component coupled to and surrounding the spacer component,
   an outer cap component disposed at an upper end of the shaft and an upper end of the spacer component at a location outside the exhaust conduit,
   mounting ring members securing the inner cap component to the outer cap component, and
   an insulating region defined by an outer surface of the shaft, inner surfaces of the spacer component, and a lower surface of the outer cap component.

2. The lance injector assembly of claim 1, further comprising a plurality of cooling lines located within the shaft, the cooling lines configured to circulate a coolant.

3. The lance injector assembly of claim 2, wherein the coolant is at least one of reductant, an engine fluid, and a transmission fluid.

4. The lance injector assembly of claim 1, wherein a length of the shaft is within a range of 2.5 inches to 6.5 inches.

5. The lance injector assembly of claim 1, wherein the hydraulically-actuated valve comprises a spring operated valve.

6. The lance injector assembly of claim 5, wherein the spring operated valve comprises a spring configured to exert a preload force against a valve member, the valve member configured to block reductant from flowing through a nozzle orifice.

7. The lance injector assembly of claim 1, wherein the lance injector does not use air as a transport mechanism for a supply of reductant.

8. The lance injector assembly of claim 1, wherein the hydraulically-actuated valve is configured to be operated by controlling a pressure of the reductant.

9. The lance injector assembly of claim 1, wherein the hydraulically-actuated valve is configured to be operated by mechanical actuation of a shaft component.

10. The lance injector assembly of claim 1, wherein the actuator is positioned outside of the exhaust conduit, the actuator coupled to the shaft by the mounting system.

11. The lance injector assembly of claim 1, wherein the actuator is a remote actuator positioned a distance away from the hydraulically-actuated valve.

12. The lance injector assembly of claim 1, wherein the actuator is an electronic actuator.

13. The lance injector assembly of claim 1, wherein the insulating region is positioned between the shaft and the actuator, the insulating region configured to prevent the transfer of heat from an exhaust pipe to the actuator.

14. The lance injector assembly of claim 1, wherein the insulating region is filled with at least one of air, a vacuum, and an insulating material.

15. The lance injector assembly of claim 1, wherein the shaft is further comprising a thermal barrier coating configured to provide thermal protection.

\* \* \* \* \*